United States Patent
Zhang

(10) Patent No.: US 12,089,167 B2
(45) Date of Patent: Sep. 10, 2024

(54) SIGNAL SENDING METHOD, PRIORITY CONFIGURATION METHOD, AND DEVICE

(71) Applicant: HUAWEI TECHNOLOGIES CO., LTD., Guangdong (CN)

(72) Inventor: Xingwei Zhang, Lund (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 475 days.

(21) Appl. No.: 17/362,660

(22) Filed: Jun. 29, 2021

(65) Prior Publication Data
US 2021/0329568 A1 Oct. 21, 2021

Related U.S. Application Data

(63) Continuation of application No. PCT/CN2019/127678, filed on Dec. 23, 2019.

(30) Foreign Application Priority Data

Dec. 29, 2018 (CN) .......................... 201811647683.4

(51) Int. Cl.
*H04W 72/20* (2023.01)
*H04W 52/18* (2009.01)
(Continued)

(52) U.S. Cl.
CPC ....... *H04W 52/281* (2013.01); *H04W 52/346* (2013.01); *H04W 52/367* (2013.01);
(Continued)

(58) Field of Classification Search
CPC ............ H04W 52/281; H04W 52/346; H04W 52/367; H04W 72/0473; H04W 72/20; H04W 72/56; H04W 52/18
See application file for complete search history.

(56) References Cited

U.S. PATENT DOCUMENTS

2020/0396701 A1* 12/2020 Yi .......................... H04W 52/383
2021/0345360 A1* 11/2021 Yeo ........................ H04W 72/20
2022/0256470 A1* 8/2022 Zhang .................... H04L 1/1887

FOREIGN PATENT DOCUMENTS

CN 102573030 A 7/2012
CN 102858005 A 1/2013
(Continued)

OTHER PUBLICATIONS

R1-1720486, Nokia et al, Tx power allocation in SL CA, 3GPP TSG-RAN WG1 Meeting #91, Reno, USA, Nov. 27-Dec. 1, 2017, total 2 pages.
Samsung et al., "Discussion on Physical Layer Procedures",3GPP TSG RAN WG1 Meeting #95 Spokane, USA, Nov. 12-16, 2018, R1-1812985, total:6pages.
(Continued)

*Primary Examiner* — Blane J Jackson
(74) *Attorney, Agent, or Firm* — James Harrison

(57) ABSTRACT

Disclosed are a signal sending method, a priority configuration method, and a device. The signal sending method includes: determining that S signals overlap in time domain; determining M signals in the S signals based on a maximum transmit power of a terminal device and priorities of the S signals, where the S signals include n sidelink signals and k uplink signals, n is a positive integer, k is an integer greater than or equal to 0, a total transmit power of the M signals is less than or equal to the maximum transmit power, and M is a positive integer; and sending the M signals. In embodiments of this application, a plurality of sidelink signals may be simultaneously sent, or a sidelink signal and an uplink signal may be simultaneously sent, thereby resolving a problem that currently a sidelink signal and an uplink signal cannot be simultaneously sent.

10 Claims, 8 Drawing Sheets

(51) Int. Cl.
  *H04W 52/28* (2009.01)
  *H04W 52/34* (2009.01)
  *H04W 52/36* (2009.01)
  *H04W 72/56* (2023.01)
  *H04W 72/044* (2023.01)

(52) U.S. Cl.
  CPC ........... *H04W 72/20* (2023.01); *H04W 72/56* (2023.01); *H04W 72/0473* (2013.01)

(56) References Cited

FOREIGN PATENT DOCUMENTS

| | | | | |
|---|---|---|---|---|
| CN | 107889157 | A | 4/2018 | |
| CN | 107889230 | A | 4/2018 | |
| JP | 6731611 | B2 * | 7/2020 | ........... H04L 5/0007 |
| WO | 2013071778 | A1 | 5/2013 | |
| WO | WO-2021152808 | A1 * | 8/2021 | ........ H04W 72/1242 |

OTHER PUBLICATIONS

ZTE, Sanechips et al., "Coexistence between NR V2X and LTE V2X", 3GPP TSG RAN WG1 Meeting #95 Spokane, USA, Nov. 12-16, 2018, R1-1813178, total:4pages.

Nokia, Nokia Shanghai Bell et al., "Tx power allocation in SL CA", 3GPP TSG-RAN WG1 Meeting #92, Athens, Greece, Feb. 26-Mar. 2, 2018, R1-1802581, total:2pages.

LG Electronics et al., "Discussion on coexistence mechanisms", 3GPP TSG RAN WG1 Meeting #94 Gothenburg, Sweden, Aug. 20-24, 2018,R1-1808528, total:8pages.

3GPP TSG RAN WG1 Meeting #92bis, R1-1804256 , Remaining Details for Mode 4 support for V2X carrier aggregation, Nokia, Nokia Shanghai Bell ,Sanya, China, Apr. 16-20, 2018,total 3 pages.

Huawei, HiSilicon, Design and contents of PSCCH and PSFCH. 3GPP TSG RAN WG1 Meeting #95, Spokane, USA, Nov. 12-16, 2018, R1-1813554, 7 pages.

* cited by examiner

SIGNAL SENDING METHOD, PRIORITY CONFIGURATION METHOD, AND DEVICE

CROSS-REFERENCE TO RELATED APPLICATIONS

This application is a continuation of International Application No. PCT/CN2019/127678, filed on Dec. 23, 2019, which claims priority to Chinese Patent Application No. 201811647683.4, filed on Dec. 29, 2018, The disclosures of the aforementioned applications are hereby incorporated by reference in their entireties.

TECHNICAL FIELD

This application relates to the field of communications technologies, and in particular, to a signal sending method, a priority configuration method, and a device.

BACKGROUND

Vehicle-to-everything (V2X) communication is a key technology of a future intelligent transport system (ITS), that includes vehicle-to-vehicle (V2V) direct communication, vehicle-to-infrastructure (V2I) direct communication, vehicle-to-pedestrian (V2P) direct communication, and vehicle-to-network (V2N) communication interaction. A V2X technology can well adapt to different application scenarios. Traffic information, such as information about real-time road conditions, roads, and pedestrians, can be obtained through communication, thereby greatly improving traffic safety, reducing congestion, and improving traffic efficiency. In addition, the V2X technology provides a basic platform for easy implementation of autonomous driving, intelligent transport, and Internet of vehicles innovation with low costs.

In long term evolution (LTE) V2X, only a physical sidelink control channel (PSCCH) and a physical sidelink shared channel (PSSCH) may be simultaneously sent in a frequency division multiplexing (FDM) manner. When the PSCCH and the PSSCH are simultaneously sent, a power allocation manner of the PSCCH and the PSSCH is as follows: A transmit power of the PSCCH is fixedly 3 dB higher than a transmit power of the PSSCH.

Compared with LTE V2X, a new channel, for example, a physical sidelink feedback channel (PSFCH) may be introduced into new radio (NR) V2X. However, LTE V2X also supports only simultaneous sending of the PSCCH and the PSSCH in the FDM manner, and for another sidelink (SL) channel, a terminal device cannot perform simultaneous sending.

SUMMARY

Embodiments of this application provide a signal sending method, a priority configuration method, and a device, to simultaneously send a plurality of sidelink channels.

According to a first aspect, a signal sending method is provided. The method includes: determining that S signals overlap in time domain, where S is an integer greater than or equal to 2; determining M signals in the S signals based on a maximum transmit power of a terminal device and priorities of the S signals, where the S signals include n sidelink signals and k uplink signals, n is a positive integer, k is an integer greater than or equal to 0, a total transmit power of the M signals is less than or equal to the maximum transmit power, and M is a positive integer; and sending the M signals.

The method may be performed by a first communications apparatus. The first communications apparatus may be the terminal device or a communications apparatus that can support the terminal device in implementing a function required by the method. Certainly, the first communications apparatus may alternatively be another communications apparatus, for example, a chip system. Herein, an example in which the first communications apparatus is the terminal device is used.

In this embodiment of this application, if the S signals overlap in time domain, the M signals may be selected from the S signals based on the maximum transmit power of the terminal device and the priorities of the S signals, for sending. This is equivalent to selecting the M signals from the S signals based on a priority sequence, for simultaneous sending. In addition, the S signals include the sidelink signal. To be specific, a plurality of sidelink signals may be simultaneously sent, thereby resolving a current problem. In addition, the sidelink signal and the uplink signal may also be simultaneously sent, thereby resolving a problem that currently a sidelink signal and an uplink signal cannot be simultaneously sent. Moreover, a signal is selected for sending based on a priority, and a signal with a higher priority can be preferentially sent, so that a sending success rate of the signal with the higher priority is improved as much as possible.

With reference to the first aspect, in a possible implementation of the first aspect, the determining M signals in the S signals based on a maximum transmit power of a terminal device and priorities of the S signals includes: when a total transmit power of the S signals is greater than the maximum transmit power, determining the M signals in the S signals based on the maximum transmit power and the priorities of the S signals.

When the total transmit power of all of the S signals is greater than the maximum transmit power of the terminal device, simultaneous sending of the S signals may not be supported. Therefore, the terminal device may further determine the M signals in this case, so that a process of determining the M signals better meets an actual requirement.

With reference to the first aspect, in a possible implementation of the first aspect, priorities of the M signals are higher than priorities of S-M signals other than the M signals in the S signals.

The M signals determined by the terminal device based on the maximum transmit power of the terminal device and the priorities of the S signals may be signals with highest priorities in the S signals, so that a signal with a higher priority can be preferentially sent as much as possible when a transmit power is limited.

With reference to the first aspect, in a possible implementation of the first aspect, a total transmit power of the M signals and a first signal is greater than the maximum transmit power, the total transmit power of the M signals is less than the maximum transmit power, and the first signal is a signal with a highest priority in the S-M signals other than the M signals in the S signals; and the method further includes: sending the first signal at a remaining transmit power, where the remaining transmit power is a difference between the maximum transmit power and the total transmit power of the M signals.

To fully use a transmit power of the terminal device to enable the terminal device to send more signals at a time, the terminal device may determine M based on a principle of exhausting the maximum transmit power of the terminal device as much as possible. For example, the terminal device determines G signals in the S signals, where a total transmit power of all of the G signals is less than or equal to the maximum transmit power of the terminal device. If the total transmit power of all of the G signals is equal to the maximum transmit power of the terminal device, the G signals are the M signals, and G=M. If the total transmit power of all of the G signals is less than the maximum transmit power of the terminal device, the terminal device continues to determine X signals in S−G signals, where the X signals have a same priority, and the priorities of the X signals are greater than priorities of S−G−X signals. If a total transmit power of all of G+X signals is equal to the maximum transmit power of the terminal device, G+X=M. If the total transmit power of all of the G+X signals is greater than the maximum transmit power of the terminal device, G=M. For example, G=1, and the signal is referred to as the first signal. In this case, the total transmit power of the M signals and the first signal may be greater than the maximum transmit power of the terminal device, and the first signal is the signal with the highest priority in the S−M signals other than the M signals in the S signals. In this manner, a maximum of M signals can be simultaneously sent as much as possible (it may be understood that if one more signal is selected, a total transmit power of all of the selected signals is greater than the maximum transmit power of the terminal device; therefore, M is a maximum quantity of signals that can be selected), to fully use the transmit power of the terminal device.

In this case, the terminal device may discard the first signal; in other words, the terminal device discards the S−M signals. Alternatively, the terminal device may send the first signal. For example, the terminal device may send the first signal by using the remaining transmit power of the terminal device. In this way, the transmit power of the terminal device can be better fully used.

With reference to the first aspect, in a possible implementation of the first aspect, the sidelink signal is a signal carried on a sidelink channel, or the uplink signal is a signal and/or an SRS carried on an uplink channel; a priority sequence of the S signals is determined based on a priority criterion; the sidelink channel includes at least one of a PBCH, a PSFCH, a PSDCH, a PSCCH, or a PSSCH; the uplink channel includes at least one of a PRACH, a PUCCH, or a PUSCH; and the priority criterion includes at least one of a first priority criterion, a second priority criterion, a third priority criterion, a fourth priority criterion, a fifth priority criterion, a sixth priority criterion, a seventh priority criterion, or an eighth priority criterion;

the first priority criterion is that a priority of an uplink channel is higher than a priority of a sidelink channel;
the second priority criterion is that a priority of a broadcast channel is higher than a priority of a multicast channel or a unicast channel;
the third priority criterion is that a priority of a multicast channel is higher than a priority of a unicast channel;
the fourth priority criterion is that a priority of an LTE channel is higher than a priority of an NR channel;
the fifth priority criterion is that a priority of a control channel is higher than a priority of a data channel;
the sixth priority criterion is that a priority of a feedback channel is higher than a priority of a data channel;
the seventh priority criterion is that a priority of a discovery channel is higher than a priority of a data channel; and
the eighth priority criterion is that a priority of a control channel, a feedback channel, a discovery channel, or a data channel is higher than a priority of an SRS.

The foregoing are some examples of the priority criterion. This is not limited thereto during specific application.

With reference to the first aspect, in a possible implementation of the first aspect, each of the at least one priority criterion corresponds to one use priority, and the use priority is used to indicate a use ranking of the priority criterion corresponding to the use priority when the priority criterion is used to determine the M signals.

If the priority criterion includes the plurality of priority criteria described above, when these priority criteria are used in different sequences, in other words, when the use priorities are different, results obtained by sorting the priorities of the signals may also be different. To avoid disorder, in this embodiment of this application, each of the at least one priority criterion may correspond to one use priority, and the use priority indicates the use ranking of the corresponding priority criterion when the corresponding priority criterion is used to determine the M signals, in other words, indicates a use ranking of the corresponding priority criterion when the corresponding priority criterion is used to determine a priority sequence of the S signals. The use priority is set for the priority criterion, so that disorder that may occur in determining the priorities of the signals can be minimized.

With reference to the first aspect, in a possible implementation of the first aspect, the M signals have a same priority, a transmit power of each of the M signals is P/M, and P is the maximum transmit power.

The M signals have the same priority. In this case, the transmit power of each of the M signals may be P/M, and P is the maximum transmit power of the terminal device. In other words, the transmit power may be evenly allocated to the M signals. In this case, for one of the M signals, P/M may meet a power requirement of the signal, or P/M may not meet a power requirement of the signal. However, because the M signals have the same priority, the M signals may be simultaneously sent by using the evenly allocated power.

With reference to the first aspect, in a possible implementation of the first aspect, the maximum transmit power is a maximum transmit power supported by a capability of the terminal device; or the maximum transmit power is a maximum transmit power configured by a network device for the terminal device; or the maximum transmit power is a maximum transmit power determined by the terminal device based on a maximum transmit power supported by a capability of the terminal device and a maximum transmit power configured by a network device for the terminal device.

In this embodiment of this application, a calculation manner of the maximum transmit power of the terminal device is not limited.

With reference to the first aspect, in a possible implementation of the first aspect, M=S, and the total transmit power of the S signals is less than or equal to the maximum transmit power.

If the total transmit power of the S signals is less than or equal to the maximum transmit power of the terminal device, the terminal device may simultaneously send the S signals, so that all to-be-sent signals can be normally sent. In this case, it may be considered that M is equal to S. Certainly, if the terminal device calculates the transmit power of each of the S signals in advance, if the total transmit power of the S signals is less than or equal to the maximum transmit power of the terminal device, the terminal device may directly simultaneously send the S signals without considering the priorities of the signals.

According to a second aspect, a priority configuration method is provided. The method includes: determining a priority criterion, where the priority criterion is used to determine a priority sequence of signals; and sending the priority criterion to a terminal device, where the priority criterion includes at least one of a first priority criterion, a second priority criterion, a third priority criterion, a fourth priority criterion, a fifth priority criterion, a sixth priority criterion, a seventh priority criterion, or an eighth priority criterion, where the first priority criterion is that a priority of an uplink channel is higher than a priority of a sidelink channel; the second priority criterion is that a priority of a broadcast channel is higher than a priority of a multicast channel or a unicast channel; the third priority criterion is that a priority of a multicast channel is higher than a priority of a unicast channel; the fourth priority criterion is that a priority of an LTE channel is higher than a priority of an NR channel; the fifth priority criterion is that a priority of a control channel is higher than a priority of a data channel; the sixth priority criterion is that a priority of a feedback channel is higher than a priority of a data channel; the seventh priority criterion is that a priority of a discovery channel is higher than a priority of a data channel; the eighth priority criterion is that a priority of a control channel, a feedback channel, a discovery channel, or a data channel is higher than a priority of an SRS; and the sidelink channel includes at least one of a PBCH, a PSFCH, a PSDCH, a PSCCH, or a PSSCH, and the uplink channel includes at least one of a PRACH, a PUCCH, or a PUSCH.

In this embodiment of this application, the priority criterion may be specified in a protocol, and a network device does not need to send the priority criterion to the terminal device; or the priority criterion may be determined by a network device and then sent to the terminal device, and the terminal device only needs to receive the priority criterion from the network device.

With reference to the second aspect, in a possible implementation of the second aspect, the method further includes: sending a use priority corresponding to each of the at least one priority criterion to the terminal device, where the use priority is used to indicate a use ranking of the priority criterion corresponding to the use priority when the priority criterion is used to determine a to-be-sent signal.

In this embodiment of this application, the use priority of the priority criterion may be specified in the protocol, and the network device does not need to send the use priority to the terminal device; or the use priority of the priority criterion may be determined by the network device and then sent to the terminal device, and the terminal device only needs to receive the use priority from the network device.

According to a third aspect, a first type of communications apparatus is provided. For example, the communications apparatus is the first communications apparatus described above. The communications apparatus is configured to perform the method according to any one of the first aspect or the possible implementations of the first aspect. Specifically, the communications apparatus may include modules configured to perform the method according to any one of the first aspect or the possible implementations of the first aspect, for example, include a processing module and a transceiver module that are coupled to each other. For example, the communications apparatus is a terminal device.

The processing module is configured to determine that S signals overlap in time domain, where S is an integer greater than or equal to 2.

The processing module is further configured to determine M signals in the S signals based on a maximum transmit power of the terminal device and priorities of the S signals, where the S signals include n sidelink signals and k uplink signals, n is a positive integer, k is an integer greater than or equal to 0, a total transmit power of the M signals is less than or equal to the maximum transmit power, and M is a positive integer.

The transceiver module is configured to send the M signals.

With reference to the third aspect, in a possible implementation of the third aspect, the processing module is configured to determine, in the following manner, the M signals in the S signals based on the maximum transmit power of the terminal device and the priorities of the S signals: when a total transmit power of the S signals is greater than the maximum transmit power, determining the M signals in the S signals based on the maximum transmit power and the priorities of the S signals.

With reference to the third aspect, in a possible implementation of the third aspect, priorities of the M signals are higher than priorities of S−M signals other than the M signals in the S signals.

With reference to the third aspect, in a possible implementation of the third aspect, a total transmit power of the M signals and a first signal is greater than the maximum transmit power, the total transmit power of the M signals is less than the maximum transmit power, and the first signal is a signal with a highest priority in the S−M signals other than the M signals in the S signals; and the transceiver module is further configured to send the first signal at a remaining transmit power, where the remaining transmit power is a difference between the maximum transmit power and the total transmit power of the M signals.

With reference to the third aspect, in a possible implementation of the third aspect, the sidelink signal is a signal carried on a sidelink channel, or the uplink signal is a signal and/or an SRS carried on an uplink channel; a priority sequence of the S signals is determined based on a priority criterion; the sidelink channel includes at least one of a PBCH, a PSFCH, a PSDCH, a PSCCH, or a PSSCH; the uplink channel includes at least one of a PRACH, a PUCCH, or a PUSCH; and the priority criterion includes at least one of a first priority criterion, a second priority criterion, a third priority criterion, a fourth priority criterion, a fifth priority criterion, a sixth priority criterion, a seventh priority criterion, or an eighth priority criterion;

the first priority criterion is that a priority of an uplink channel is higher than a priority of a sidelink channel;

the second priority criterion is that a priority of a broadcast channel is higher than a priority of a multicast channel or a unicast channel;

the third priority criterion is that a priority of a multicast channel is higher than a priority of a unicast channel;

the fourth priority criterion is that a priority of an LTE channel is higher than a priority of an NR channel;

the fifth priority criterion is that a priority of a control channel is higher than a priority of a data channel;

the sixth priority criterion is that a priority of a feedback channel is higher than a priority of a data channel;

the seventh priority criterion is that a priority of a discovery channel is higher than a priority of a data channel; and the eighth priority criterion is that a priority of a control channel, a feedback channel, a discovery channel, or a data channel is higher than a priority of an SRS.

With reference to the third aspect, in a possible implementation of the third aspect, each of the at least one priority criterion corresponds to one use priority, and the use priority is used to indicate a use ranking of the priority criterion corresponding to the use priority when the priority criterion is used to determine the M signals.

With reference to the third aspect, in a possible implementation of the third aspect, the M signals have a same priority, a transmit power of each of the M signals is P/M, and P is the maximum transmit power.

With reference to the third aspect, in a possible implementation of the third aspect, the maximum transmit power is a maximum transmit power supported by a capability of the terminal device; or the maximum transmit power is a maximum transmit power configured by a network device for the terminal device; or the maximum transmit power is a maximum transmit power determined by the terminal device based on a maximum transmit power supported by a capability of the terminal device and a maximum transmit power configured by a network device for the terminal device.

With reference to the third aspect, in a possible implementation of the third aspect, M=S, and the total transmit power of the S signals is less than or equal to the maximum transmit power.

For technical effects achieved by the third aspect or the possible implementations of the third aspect, refer to the descriptions of the technical effects of the first aspect or the possible implementations of the first aspect.

According to a fourth aspect, a second type of communications apparatus is provided. For example, the communications apparatus is the second communications apparatus described above. The communications apparatus is configured to perform the method according to any one of the second aspect or the possible implementations of the second aspect. Specifically, the communications apparatus may include modules configured to perform the method according to any one of the second aspect or the possible implementations of the second aspect, for example, include a processing module and a transceiver module that are coupled to each other. For example, the communications apparatus is a network device.

The processing module is configured to determine a priority criterion, where the priority criterion is used to determine a priority sequence of signals.

The transceiver module is configured to send the priority criterion to a terminal device, where the priority criterion includes at least one of a first priority criterion, a second priority criterion, a third priority criterion, a fourth priority criterion, a fifth priority criterion, a sixth priority criterion, a seventh priority criterion, or an eighth priority criterion, where the first priority criterion is that a priority of an uplink channel is higher than a priority of a sidelink channel;
the second priority criterion is that a priority of a broadcast channel is higher than a priority of a multicast channel or a unicast channel;
the third priority criterion is that a priority of a multicast channel is higher than a priority of a unicast channel;
the fourth priority criterion is that a priority of an LTE channel is higher than a priority of an NR channel;
the fifth priority criterion is that a priority of a control channel is higher than a priority of a data channel;
the sixth priority criterion is that a priority of a feedback channel is higher than a priority of a data channel;
the seventh priority criterion is that a priority of a discovery channel is higher than a priority of a data channel;
the eighth priority criterion is that a priority of a control channel, a feedback channel, a discovery channel, or a data channel is higher than a priority of an SRS; and
the sidelink channel includes at least one of a PBCH, a PSFCH, a PSDCH, a PSCCH, or a PSSCH, and the uplink channel includes at least one of a PRACH, a PUCCH, or a PUSCH.

With reference to the fourth aspect, in a possible implementation of the fourth aspect, the transceiver module is further configured to send a use priority corresponding to each of the at least one priority criterion to the terminal device, where the use priority is used to indicate a use ranking of the priority criterion corresponding to the use priority when the priority criterion is used to determine a to-be-sent signal.

For technical effects achieved by the fourth aspect or the possible implementations of the fourth aspect, refer to the descriptions of the technical effects of the second aspect or the possible implementations of the second aspect.

According to a fifth aspect, a third type of communications apparatus is provided. For example, the communications apparatus is the first communications apparatus described above. The communications apparatus includes a processor and a transceiver, and is configured to implement the method described in the first aspect or the possible designs of the first aspect. For example, the communications apparatus is a chip disposed in a communications device. For example, the communications device is a terminal device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The processor is configured to determine that S signals overlap in time domain, where S is an integer greater than or equal to 2.

The processor is further configured to determine M signals in the S signals based on a maximum transmit power of the terminal device and priorities of the S signals, where the S signals include n sidelink signals and k uplink signals, n is a positive integer, k is an integer greater than or equal to 0, a total transmit power of the M signals is less than or equal to the maximum transmit power, and M is a positive integer.

The transceiver is configured to send the M signals.

With reference to the fifth aspect, in a possible implementation of the fifth aspect, the processor is configured to determine, in the following manner, the M signals in the S signals based on the maximum transmit power of the terminal device and the priorities of the S signals: when a total transmit power of the S signals is greater than the maximum transmit power, determining the M signals in the S signals based on the maximum transmit power and the priorities of the S signals.

With reference to the fifth aspect, in a possible implementation of the fifth aspect, priorities of the M signals are higher than priorities of S−M signals other than the M signals in the S signals.

With reference to the fifth aspect, in a possible implementation of the fifth aspect, a total transmit power of the M signals and a first signal is greater than the maximum transmit power, the total transmit power of the M signals is less than the maximum transmit power, and the first signal is a signal with a highest priority in the S–M signals other than the M signals in the S signals; and the transceiver is further configured to send the first signal at a remaining transmit power, where the remaining transmit power is a difference between the maximum transmit power and the total transmit power of the M signals.

With reference to the fifth aspect, in a possible implementation of the fifth aspect, the sidelink signal is a signal carried on a sidelink channel, or the uplink signal is a signal and/or an SRS carried on an uplink channel; a priority sequence of the S signals is determined based on a priority criterion; the sidelink channel includes at least one of a PBCH, a PSFCH, a PSDCH, a PSCCH, or a PSSCH; the uplink channel includes at least one of a PRACH, a PUCCH, or a PUSCH; and the priority criterion includes at least one of a first priority criterion, a second priority criterion, a third priority criterion, a fourth priority criterion, a fifth priority criterion, a sixth priority criterion, a seventh priority criterion, or an eighth priority criterion;

the first priority criterion is that a priority of an uplink channel is higher than a priority of a sidelink channel;
the second priority criterion is that a priority of a broadcast channel is higher than a priority of a multicast channel or a unicast channel;
the third priority criterion is that a priority of a multicast channel is higher than a priority of a unicast channel;
the fourth priority criterion is that a priority of an LTE channel is higher than a priority of an NR channel;
the fifth priority criterion is that a priority of a control channel is higher than a priority of a data channel;
the sixth priority criterion is that a priority of a feedback channel is higher than a priority of a data channel;
the seventh priority criterion is that a priority of a discovery channel is higher than a priority of a data channel; and
the eighth priority criterion is that a priority of a control channel, a feedback channel, a discovery channel, or a data channel is higher than a priority of an SRS.

With reference to the fifth aspect, in a possible implementation of the fifth aspect, each of the at least one priority criterion corresponds to one use priority, and the use priority is used to indicate a use ranking of the priority criterion corresponding to the use priority when the priority criterion is used to determine the M signals.

With reference to the fifth aspect, in a possible implementation of the fifth aspect, the M signals have a same priority, a transmit power of each of the M signals is P/M, and P is the maximum transmit power.

With reference to the fifth aspect, in a possible implementation of the fifth aspect, the maximum transmit power is a maximum transmit power supported by a capability of the terminal device; or the maximum transmit power is a maximum transmit power configured by a network device for the terminal device; or the maximum transmit power is a maximum transmit power determined by the terminal device based on a maximum transmit power supported by a capability of the terminal device and a maximum transmit power configured by a network device for the terminal device.

With reference to the fifth aspect, in a possible implementation of the fifth aspect, M=S, and the total transmit power of the S signals is less than or equal to the maximum transmit power.

For technical effects achieved by the fifth aspect or the possible implementations of the fifth aspect, refer to the descriptions of the technical effects of the first aspect or the possible implementations of the first aspect.

According to a sixth aspect, a fourth type of communications apparatus is provided. For example, the communications apparatus is the second communications apparatus described above. The communications apparatus includes a processor and a transceiver, and is configured to implement the method described in the second aspect or the possible designs of the second aspect. For example, the communications apparatus is a chip disposed in a communications device. For example, the communications device is a network device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The processor is configured to determine a priority criterion, where the priority criterion is used to determine a priority sequence of signals.

The transceiver is configured to send the priority criterion to a terminal device, where the priority criterion includes at least one of a first priority criterion, a second priority criterion, a third priority criterion, a fourth priority criterion, a fifth priority criterion, a sixth priority criterion, a seventh priority criterion, or an eighth priority criterion, where the first priority criterion is that a priority of an uplink channel is higher than a priority of a sidelink channel;
the second priority criterion is that a priority of a broadcast channel is higher than a priority of a multicast channel or a unicast channel;
the third priority criterion is that a priority of a multicast channel is higher than a priority of a unicast channel;
the fourth priority criterion is that a priority of an LTE channel is higher than a priority of an NR channel;
the fifth priority criterion is that a priority of a control channel is higher than a priority of a data channel;
the sixth priority criterion is that a priority of a feedback channel is higher than a priority of a data channel;
the seventh priority criterion is that a priority of a discovery channel is higher than a priority of a data channel;
the eighth priority criterion is that a priority of a control channel, a feedback channel, a discovery channel, or a data channel is higher than a priority of an SRS; and
the sidelink channel includes at least one of a PBCH, a PSFCH, a PSDCH, a PSCCH, or a PSSCH, and the uplink channel includes at least one of a PRACH, a PUCCH, or a PUSCH.

With reference to the sixth aspect, in a possible implementation of the sixth aspect, the transceiver is further configured to send a use priority corresponding to each of the at least one priority criterion to the terminal device, where the use priority is used to indicate a use ranking of the priority criterion corresponding to the use priority when the priority criterion is used to determine a to-be-sent signal.

For technical effects achieved by the sixth aspect or the possible implementations of the sixth aspect, refer to the descriptions of the technical effects of the second aspect or the possible implementations of the second aspect.

According to a seventh aspect, a fifth type of communications apparatus is provided. The communications apparatus may be the first communications apparatus in the foregoing method designs. For example, the communications apparatus is a chip disposed in a terminal device. The communications apparatus includes: a memory, configured to store computer-executable program code; and a processor, where the processor is coupled to the memory. The program code stored in the memory includes instructions, and when the processor executes the instructions, the fifth type of communications apparatus is enabled to perform the method according to any one of the first aspect or the possible implementations of the first aspect.

The fifth type of communications apparatus may further include a communications interface. The communications interface may be a transceiver in the terminal device, for example, implemented by using an antenna, a feeder, and a codec in the communications apparatus. Alternatively, if the fifth type of communications apparatus is the chip disposed in the terminal device, the communications interface may be an input/output interface in the chip, for example, an input/output pin.

According to an eighth aspect, a sixth type of communications apparatus is provided. The communications apparatus may be the second communications apparatus in the foregoing method designs. For example, the communications apparatus is a chip disposed in a network device. The communications apparatus includes: a memory, configured to store computer-executable program code; and a processor, where the processor is coupled to the memory. The program code stored in the memory includes instructions, and when the processor executes the instructions, the sixth type of communications apparatus is enabled to perform the method according to any one of the second aspect or the possible implementations of the second aspect.

The sixth type of communications apparatus may further include a communications interface. The communications interface may be a transceiver in the network device, for example, implemented by using an antenna, a feeder, and a codec in the communications apparatus. Alternatively, if the sixth type of communications apparatus is the chip disposed in the network device, the communications interface may be an input/output interface in the chip, for example, an input/output pin.

According to a ninth aspect, a communications system is provided. The communications system may include the first type of communications apparatus according to the third aspect, the third type of communications apparatus according to the fifth aspect, or the fifth type of communications apparatus according to the seventh type, and the second type of communications apparatus according to the fourth aspect, the fourth type of communications apparatus according to the sixth aspect, or the sixth type of communications apparatus according to the eighth aspect.

According to a tenth aspect, a computer storage medium is provided. The computer-readable storage medium stores instructions, and when the instructions are run on a computer, the computer is enabled to perform the method according to any one of the first aspect or the possible designs of the first aspect.

According to an eleventh aspect, a computer storage medium is provided. The computer-readable storage medium stores instructions, and when the instructions are run on a computer, the computer is enabled to perform the method according to any one of the second aspect or the possible designs of the second aspect.

According to a twelfth aspect, a computer program product including instructions is provided. The computer program product stores the instructions, and when the computer program product runs on a computer, the computer is enabled to perform the method according to any one of the first aspect or the possible designs of the first aspect.

According to a thirteenth aspect, a computer program product including instructions is provided. The computer program product stores the instructions, and when the computer program product runs on a computer, the computer is enabled to perform the method according to any one of the second aspect or the possible designs of the second aspect.

In the embodiments of this application, the M signals may be selected from the S signals based on a priority sequence, for simultaneous sending. In addition, the S signals include the sidelink signal. To be specific, a plurality of sidelink signals may be simultaneously sent, thereby resolving a current problem. In addition, the sidelink signal and the uplink signal may also be simultaneously sent, thereby resolving a problem that currently a sidelink signal and an uplink signal cannot be simultaneously sent.

DESCRIPTION OF EMBODIMENTS

Figures 1, 2:
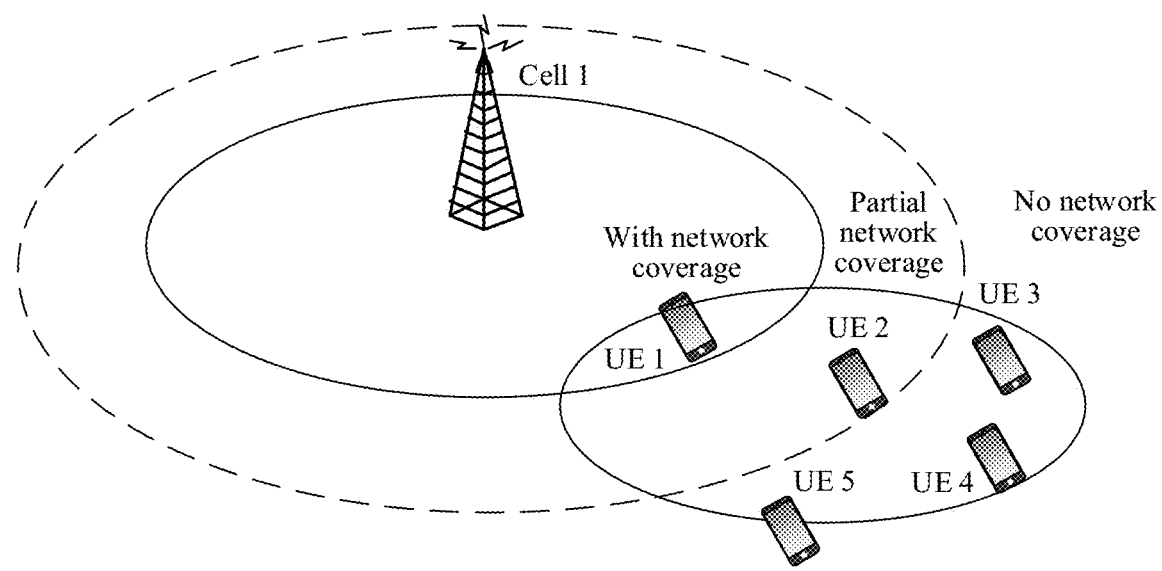
FIG. 1 is a schematic diagram of comparison between symbol lengths at three subcarrier spacings.
FIG. 2 is a schematic diagram of several D2D coverage scenarios.

To make the objectives, the technical solutions, and advantages of the embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device communication (D2D) terminal device, a V2X terminal device, a machine-to-machine/machine-type communications (M2M/MTC) terminal device, an internet of things (IoT) terminal device, a subscriber unit, a subscriber station, a mobile station, a remote station (remote station), an access point (access point, AP), a remote terminal (remote terminal), an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device is a device such as a personal communications service (PCS) phone, a cordless phone, a session initiation protocol (session initiation protocol, SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, and not limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that can be directly worn on a body or integrated into clothes or an accessory of a user. The wearable device is not only a hardware device, but implements powerful functions through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application function and need to work with other devices such as smartphones.

However, if the various terminal devices described above are located on a vehicle (for example, placed in the vehicle or installed in the vehicle), the terminal devices may be considered as vehicle-mounted terminal devices. For example, the vehicle-mounted terminal devices are also referred to as on-board units (OBU).

(2) A network device includes, for example, an access network (AN) device such as a base station (for example, an access point), and may be a device that communicates with a wireless terminal device over an air interface by using one or more cells in an access network. Alternatively, for example, a network device in a V2X technology is a road side unit (RSU). The base station may be configured to mutually convert a received over-the-air frame and a received internet protocol (IP) packet, and serve as a router between the terminal device and the other parts of the access network, where the other parts of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB) in an LTE system or a long term evolution-advanced (LTE-A) system, or may include a next generation NodeB (gNB) in a 5G NR system, or may include a centralized unit (CU) and a distributed unit (DU) in a cloud access network (Cloud RAN) system. This is not limited in the embodiments of this application.

(3) 5G is a fifth generation mobile communications technology. 5G requires higher performance than 4G. 5G NR Rel-15 defines a new air-interface access technology to support a user experience rate of 0.1 Gbps to 1 Gbps, a connection density of one million connections per square kilometer, an end-to-end millisecond-level latency, a traffic density of dozens of Tbps per square kilometer, mobility of over 500 Km per hour, and a peak rate of dozens of Gbps. The user experience rate, the connection density, and the latency are three most basic performance indicators for 5G. In addition, efficiency of network deployment and operation needs to be greatly improved in 5G. Compared with 4G, in 5G, spectrum efficiency is to be increased by 5 to 15 times, and energy efficiency and cost efficiency are to be increased by more than 100 times.

Three major application scenarios and requirements of 5G include:
 enhanced mobile broadband (eMBB);
 massive machine-type communications (mMTC); and
 ultra-reliable and low-latency communications (URLLC).

A corresponding URLLC scenario includes unmanned driving, industrial control, or the like, and requires a low latency and high reliability. Specific requirements for the low latency are an end-to-end 0.5 ms latency and a 1 ms round-trip latency of air-interface information exchange, and a specific requirement for the high reliability is that a block error rate (BLER) reaches $10^{-5}$, that is, a proportion of correctly received data packets reaches 99.999%.

A plurality of subcarrier spacings are introduced into an NR system. Different carriers or different bandwidth parts (BWP) in a carrier may have different subcarrier spacings. A baseline is 15 kHz. A subcarrier spacing of each carrier may be 15 kHz*$2n$, where n is an integer; the subcarrier spacing ranges from 3.75 kHz, 7.5 kHz, to 480 kHz. There are a maximum of eight subcarrier spacings. Certainly, there may be other possibilities in the future. Corresponding to different subcarrier spacings, there are also different symbol lengths and slot lengths. FIG. 1 shows comparison between symbol lengths at three subcarrier spacings. f0, f1, and f2 represent the three subcarrier spacings. For example, f1 is twice a length of f0. In this case, a symbol length at f0 is twice a symbol length at f1. For example, f2 is twice a length of f1. Similarly, the symbol length at f1 is twice a symbol length at f2.

In time domain, in the NR system, one slot may include at least one of downlink transmission, a guard period (GP), uplink transmission, and the like. Such slot structures are referred to as different slot format indicators (SFI). Currently, there may be a maximum of 256 slot structures, and certainly, a possibility that there are other slot structures in the future is not excluded.

In frequency domain, because a bandwidth of a single carrier in the NR system may reach 400 MHz, a bandwidth part (BWP) is further defined in one carrier. The base station may configure a plurality of downlink (DL) BWPs/uplink (UL) BWPs for the terminal device by using radio resource control (RRC), and activate one configured DL BWP and one configured UL BWP for the terminal device by using downlink control information (DCI). Therefore, in one carrier, the base station may configure a plurality of DL BWPs/UL BWPs for the terminal device. However, at one moment, there is only one active DL BWP and one active UL BWP. When the activated BWP needs to be switched, the base station switches the activated BWP from a BWP 1 to a BWP 2 by using the DCI. Currently, it is considered that DCI used for downlink scheduling can indicate only to switch to an active DL BWP, and after receiving the DCI used for downlink scheduling, the terminal device switches to a new DL BWP to receive a physical downlink shared channel (PDSCH); signaling used for uplink scheduling can indicate only to switch to an active UL BWP, and after receiving the signaling used for uplink scheduling, the terminal device switches to a new UL BWP to send a physical uplink shared channel (PUSCH).

A base station gNB in the NR system may share a spectrum with a base station eNB in the LTE system. For example, on an uplink carrier, the base station gNB in the NR system and the base station eNB in the LTE system may coexist, to form intra-frequency networking.

From a perspective of the terminal device, the terminal device in the 5G system may support dual connectivity. In other words, one terminal device may be connected to two base stations. When the terminal device is connected to both an LTE base station and an NR base station, if the LTE base station serves as a master base station, and the NR base station serves as a secondary base station, this scenario is specifically referred to as LTE-NR dual connectivity (EN-DC). If the NR base station serves as a master base station and the LTE base station serves as a secondary base station, this scenario is specifically referred to as NR-LTE dual connectivity (NE-DC).

(4) For device-to-device (D2D), to improve spectrum utilization and maximize utilization of a radio frequency capability of an existing terminal device, it is considered that a spectrum resource of an existing mobile communications network is reused on a D2D communication link (which is also referred to as a sidelink). To avoid interfering with a terminal device of an existing network, in D2D communication, a spectrum resource of a downlink of the LTE-A system is not used, but only a spectrum resource of an uplink of the LTE-A system is reused because an anti-interference capability of the base station is stronger than an anti-interference capability of the terminal device. A probability that a D2D device performs time division multiplexing on the uplink spectrum resource is relatively high. In this case, receiving and sending do not need to be simultaneously supported. Only sending or receiving needs to be performed at one moment. The downlink of the LTE-A system is a link from the eNB to the terminal device, and the uplink of the LTE-A system is a link from the terminal device to the eNB.

In Release-12/13, D2D scenarios may be classified into three types: a scenario with network coverage, a scenario with partial network coverage, and a scenario without network coverage, as shown in FIG. 2. FIG. 2 uses an example in which the terminal device is UE. In the scenario with network coverage, the D2D device is within coverage of the base station. For example, UE 1 in FIG. 2 is UE with network coverage. In the scenario with partial network coverage, some D2D devices are within the coverage of the base station. For example, UE 2 in FIG. 2 is UE with partial network coverage, and some other D2D devices are not within the coverage of the base station. For example, UE 3, UE 4, and UE 5 in FIG. 2 are UEs without network coverage. If the terminal device can receive a signal from the network device, the terminal device is a terminal device with network coverage. If the terminal device can receive a signal from a terminal device with network coverage, the terminal device is a terminal device with partial network coverage. If the terminal device can receive neither a signal sent by the base station nor a signal sent by a terminal device with network coverage, the terminal device is a terminal device without network coverage.

A D2D communication process may be divided into two processes: a D2D device discovery process and a D2D device communication process. In the D2D device discovery process, a D2D device sends only a discovery signal, and generally sends the discovery signal through a physical sidelink discovery channel (PSDCH); and after receiving the discovery signal, another D2D device may perform handshake with the D2D device that sends the discovery signal. In the D2D device communication process, the D2D device may send control signaling and data. The control signaling is, for example, a scheduling assignment (SA). The SA has different sidelink control information (SCI) formats. The control signaling is generally sent through a PSCCH, and the data is generally sent through a PSSCH. Compared with an uplink (UL) and a downlink (DL) in LTE, a D2D communication link may be referred to as a sidelink.

From a perspective of a signal transmit end, currently, there are two modes for resource allocation in the D2D device communication process. A mode 1 is a centralized control method. A D2D resource is allocated by a central control device (for example, a base station or a relay station). The resource is allocated, through scheduling, to a terminal device serving as the signal transmit end for use. The resource allocation manner in the centralized control method is mainly applied to the scenario with network coverage. A mode 2 is a contention-based distributed resource multiplexing method. A terminal device serving as the signal transmit end obtains a sending resource from a resource pool through contention. In the scenario with network coverage, the resource pool is a whole block of resources configured by the base station, and D2D devices contend for small blocks of resources in the whole block of resources. In the scenario without network coverage, the resource pool is a predefined system resource that can be obtained by the D2D device, and D2D devices contend for a resource in the predefined system resource.

Similar to the D2D device communication process, there are also two types of resource allocation in the D2D device discovery process. A type 1 is a contention-based distributed resource multiplexing method. A terminal device serving as the signal transmit end obtains a sending resource from a resource pool through contention. In the scenario with network coverage, the resource pool is a whole block of resources configured by the base station, and D2D devices contend for small blocks of resources in the whole block of resources. In the scenario without network coverage, the resource pool is a predefined system resource that can be obtained by the D2D device, and D2D devices contend for a resource in the predefined system resource. A type 2 is a centralized control method. A D2D resource is allocated by a central control device (for example, a base station or a relay station). The resource is allocated, through scheduling, to a terminal device serving as the signal transmit end for use. The resource allocation manner in the centralized control method is mainly applied to the scenario with network coverage.

Figure 3:
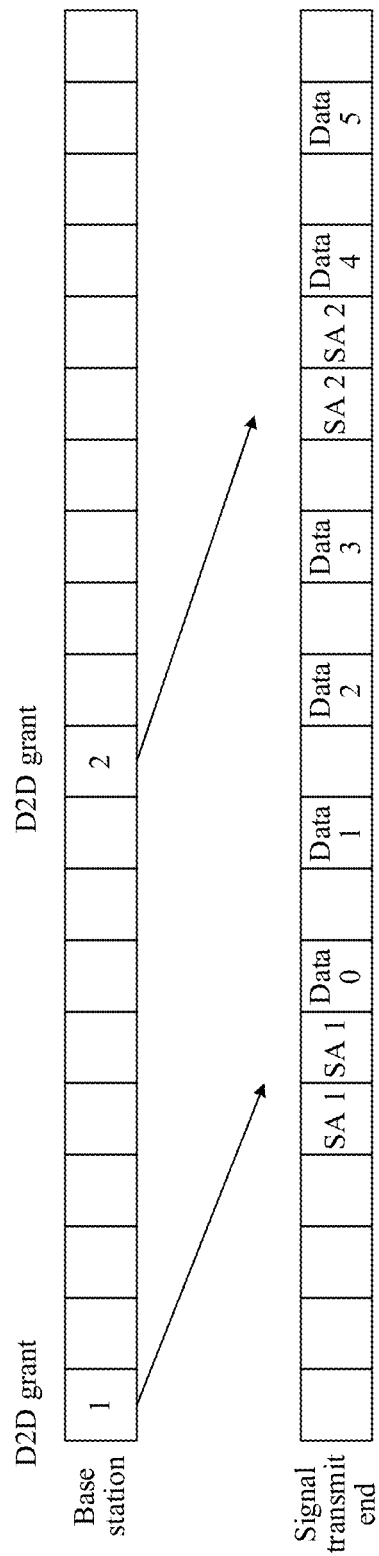
FIG. 3 is a schematic diagram of a mode 1 in a D2D communication process.

For the D2D device communication process, generally, the signal transmit end first sends an SA. It is specified in the LTE system that the SA is repeatedly sent for two times. The SA carries related information of data. Then the signal transmit end sends the data. It is specified in the LTE system that the data is repeatedly sent for four times. FIG. 3 is a schematic diagram of the mode 1. For example, both a block 1 and a block 2 indicate that a base station sends a D2D grant, and the D2D grant is used to schedule a resource used to send an SA and data. For example, the D2D grant represented by the block 1 is used to schedule resources for an SA 1 and data 0 to data 3 in the following row, and the D2D grant represented by the block 2 is used to schedule resources for an SA 2 and data 4 and data 5 in the following row. This is similar for the mode 2, except that there is no process in which the base station schedules a resource, and a resource used to send an SA and data is determined by the terminal device serving as the signal transmit end through contention. A signal receive end first blindly detects an SA. If the SA is correctly received, and an identification number (ID) carried in the SA matches at least one ID in an ID list of a recipient, it indicates that the SA is sent to the signal receive end. In this case, the signal receive end receives subsequent data based on related information of data carried in the SA.

The SA has a plurality of formats, namely, sidelink control information (SCI) formats (format), including an SCI format 0 and an SCI format 1. Using the SCI format 0 as an example, fields included in the SCI format 0 are shown in Table 1.

addition, another type of V2N may be included in V2I. V2N refers to communication between a vehicle and a base station/network.

The RSU includes two types: a terminal-type RSU and a base station-type RSU. Because the terminal-type RSU is deployed on a roadside, the terminal-type RSU is in a non-mobile state, and mobility does not need to be considered. The base station-type RSU can provide timing synchronization and resource scheduling for a vehicle that communicates with the base station-type RSU.

Figure 5:
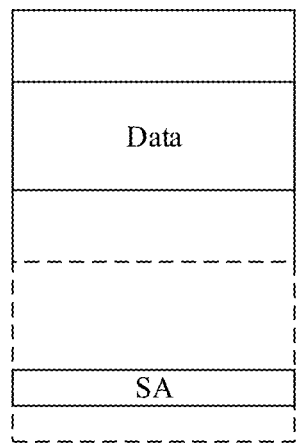
FIG. 5 is a schematic diagram of a manner in which a signal transmit end sends an SA and data in LTE V2X.

For LTE V2X communication, to meet a latency requirement, the signal transmit end may simultaneously send an SA and data in one subframe, as shown in FIG. 5. The signal receive end first blindly detects an SA, and needs to buffer data in a same subframe, because data scheduled by the SA may be in the same subframe. If the SA is correctly received and an ID carried in the SA matches an ID of the signal receive end, the signal receive end determines, based on related information of the data carried in the SA, whether to demodulate or decode the buffered data in the same subframe or receive data in a subsequent subframe. In a manner shown in FIG. 5, a resource used to send the SA and a resource used to send the data have respective resource pools. A part shown in a dashed-line box in FIG. 5 is the resource pool of the SA, and a remaining part other than the part in the dashed-line box is the resource pool of the data.

Figure 6:
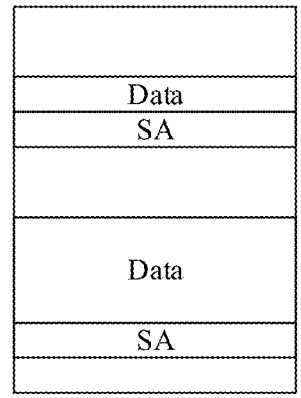
FIG. 6 is a schematic diagram of another manner in which a signal transmit end sends an SA and data in LTE V2X.

To reduce a peak to average power ratio (PAPR), for a terminal device, a resource used to send an SA and a resource used to send data are preferably contiguous in frequency domain. Therefore, in another method, the SA and the data share a resource pool. The SA and the data may be continuously placed in frequency domain, as shown in FIG. 6.

TABLE 1

| Fields | Bits | Descriptions |
| --- | --- | --- |
| Frequency hopping (FH) | 1 | Whether to use frequency hopping (Whether or not to use frequency hopping). A frequency hopping pattern is fixed in the specification (The frequency hopping pattern is fixed in the specification). |
| Resource block assignment (frequency domain position of a data resource (frequency position of data resource)) | 5 to 13 | An uplink type 0 resource position can be reused (UL type 0 resource allocation can be reused) |
| TRP Time domain position of a data resource (TRP) | 7 | Bit mapping (bitmap) |
| Modulation and coding scheme (MCS) | 5 | 64 quadrature amplitude modulation (64QAM) precluded (precluded) |
| Timing advance (TA) | 11 | Reception timing adjustment of data |
| ID | 8 | Destination ID |
| Total quantity | 37 to 45 bits | |

(5) V2X: In Release Rel-14/15/16, V2X is successfully initiated as a main application of a D2D technology. On a basis of the existing D2D technology, a specific application requirement of V2X is optimized in V2X, to further reduce an access latency of a V2X device and address a resource conflict.

Figure 4:
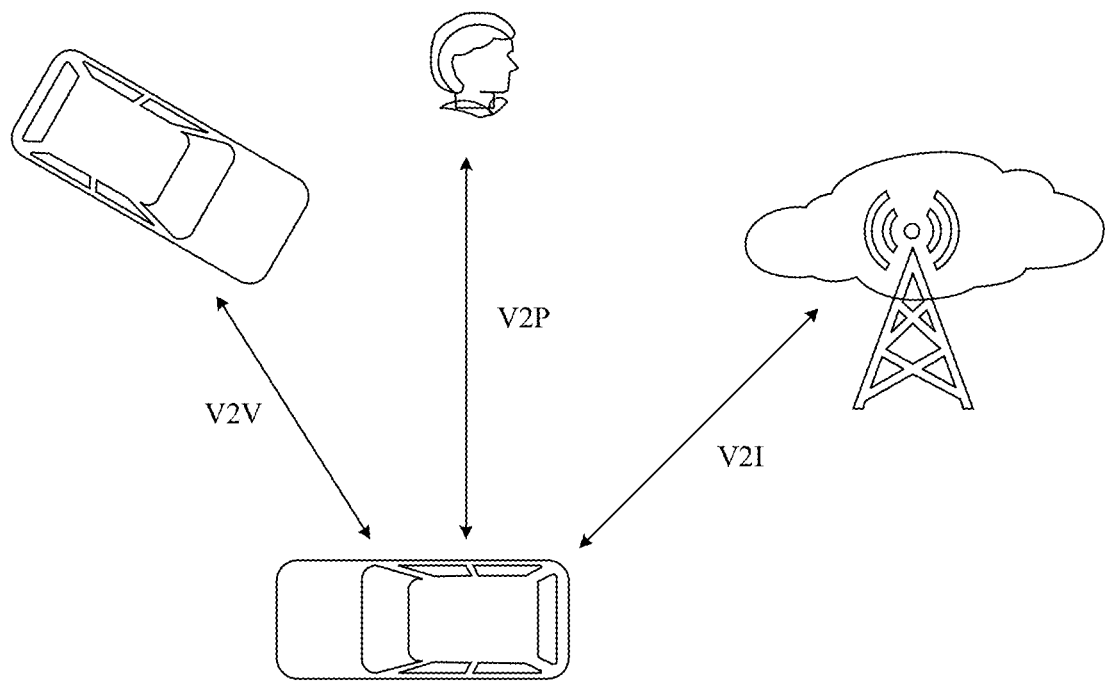
FIG. 4 is a schematic diagram of several V2X scenarios.
Figure 7A:
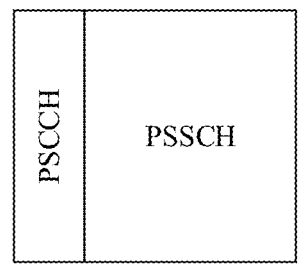
FIG. 7A to FIG. 7E are schematic diagrams of several multiplexing manners of control information and data in V2X.
Figure 7B:
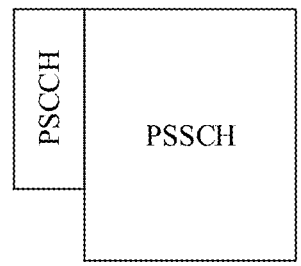
Figure 7C:
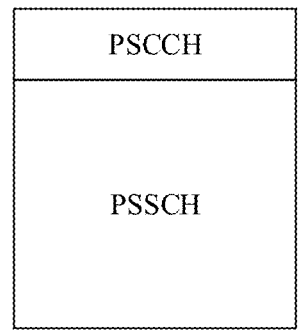
Figure 7D:
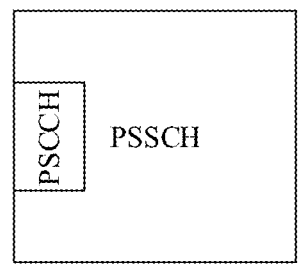
Figure 7E:
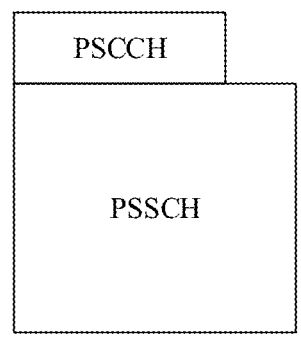

Further, V2X specifically includes three application requirements: V2V, V2P, and V2I/N, as shown in FIG. 4. V2V refers to communication between vehicles. V2P refers to communication between a vehicle and a person (including a pedestrian, a bicycle rider, a driver, or a passenger). V2I refers to communication between a vehicle and a network device, and the network device is, for example, an RSU. In In NR V2X, a plurality of multiplexing manners of control information and data may be supported, for example, the following five manners:

1. a time division multiplexing (TDM) manner, where a frequency domain bandwidth occupied by the data is the same as a frequency domain bandwidth occupied by the control information, referring to FIG. 7A;
2. a TDM manner, where a frequency domain bandwidth occupied by the data is different from a frequency domain bandwidth occupied by the control information, but a start position of a frequency domain resource occupied by the data is the same as a start position of a frequency domain resource occupied by the control information, referring to FIG. 7B;

3. an FDM manner, where a time domain length of the data is the same as a time domain length of the control information, referring to FIG. 7C;
4. an embedded multiplexing manner of the data and the control information, where a resource occupied by the control information is located in a region of a resource occupied by the data; in other words, the control information reuses a part of the resource of the data, referring to FIG. 7D; and
5. an FDM manner, where a time domain length of the data is different from a time domain length of the control information, but a start position of the data in time domain is the same as a start position of the control information in time domain, referring to FIG. 7E.

For LTE D2D/V2X power control, an LTE uplink power control mechanism is basically used. Differences lie in the following aspects:

a. Compared with original LTE in which each channel has $P_O$ and $\alpha$, in D2D/V2X, further, each channel has $P_O$ and $\alpha$, and each mode has $P_O$ and $\alpha$, for example, a PSSCH in the mode 1 corresponds to $P_{O\_PSSCH,1}$ and $\alpha_{PSSCH,1}$, and a PSSCH in the mode 2 corresponds to $P_{O\_PSSCH,2}$ and $\alpha_{PSSCH,2}$. This is also similar for a control channel. $P_O$ refers to an open loop power, and a refers to a path loss compensation coefficient. For example, $P_{O\_PSSCH,1}$ refers to an open loop power of the PSSCH in the mode 1, $\alpha_{PSSCH,1}$ refers to a path loss compensation coefficient of the PSSCH in the mode 1, $P_{O\_PSSCH,2}$ refers to an open loop power of the PSSCH in the mode 2, and $\alpha_{PSSCH,2}$ refers to a path loss compensation coefficient of the PSSCH in the mode 2.

b. Although communication is performed between terminal devices, because broadcast communication in a single-transmission and multi-receiving mechanism is performed, and an uplink spectrum is shared, a path loss PL from a terminal device to a base station is used for path loss compensation of the terminal device on a sidelink, to reduce interference of D2D/V2X to an uplink signal of another terminal device.

c. In D2D, when a lower limit $P_{CMAX\_L}$ of a maximum transmit power $P_{CMAX}$ is calculated, a compensation factor $\Delta T_{ProSe}$ is added, and $P_{EMAX}$ is independently configured. $P_{CMAX}$ is a maximum transmit power of the terminal device that is calculated by the terminal device, $P_{EMAX}$ is a maximum transmit power of the terminal device that is configured by the network device for the terminal device, and the two may be equal or not equal. It may be understood that, $P_{CMAX}$ is calculated by the terminal device based on a maximum transmit power $P_{powerclass}$ supported by a capability of the terminal device and $P_{EMAX}$.

A calculation formula of a transmit power of the PSCCH is as follows:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$
$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\}$$

A calculation formula of a transmit power of the PSSCH is as follows:

$$P_{PSSCH} = 10\log_{10}\left(\frac{M_{PSSCH}}{M_{PSSCH} + 10^{\frac{3}{10}} \times M_{PSCCH}}\right) +$$
$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\}$$

$P_{O\_PSSCH,3}$ refers to an open loop power of the PSSCH in a mode 3, $\alpha_{PSSCH,3}$ refers to a path loss compensation coefficient of the PSSCH in the mode 3, $M_{PSCCH}$ refers to a bandwidth occupied by the PSCCH, $M_{PSSCH}$ refers to a bandwidth occupied by the PSSCH, $P_{CMAX}$ refers to the maximum transmit power of the terminal device that is calculated by the terminal device, and PL is a path loss from the terminal device to the network device.

(6) The terms "system" and "network" may be used interchangeably in the embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of these items, including a singular item (piece) or any combination of plural items (pieces). For example, at least one item (piece) of a, b, or c may indicate a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first priority criterion and a second priority criterion are merely used to distinguish between different criteria, but do not indicate different content, priorities, importance, or the like of the two criteria.

The foregoing describes some concepts in the embodiments of this application. The following describes technical features in the embodiments of this application.

In LTE V2X, only the PSCCH and the PSSCH may be simultaneously sent in the FDM manner. When the PSCCH and the PSSCH are simultaneously sent, a power allocation manner of the PSCCH and the PSSCH is as follows: The transmit power of the PSCCH is fixedly 3 dB higher than the transmit power of the PSSCH.

However, if the terminal device needs to simultaneously send an uplink channel and a sidelink channel, the terminal device can send only one of the uplink channel and the sidelink channel, and cannot simultaneously send the two channels. For example, according to a current specification, if a service priority of the sidelink channel is greater than a threshold, only the sidelink channel is sent, and the uplink channel is not sent; otherwise, only the uplink channel is sent, and the sidelink channel is not sent. For example, the service priority of the sidelink channel may be measured by using a sidelink service priority per packet (PPPP). If the PPPP of the sidelink channel is greater than a threshold, only the sidelink channel is sent, and the uplink channel is not sent; otherwise, only the uplink channel is sent, and the sidelink channel is not sent.

Compared with LTE V2X, a new channel, for example, a PSFCH may be introduced into NR V2X. However, LTE V2X also supports only simultaneous sending of the PSCCH and the PSSCH in the FDM manner, for another sidelink channel, the terminal device cannot perform simultaneous sending. In addition, if the terminal device needs to simultaneously send the uplink channel and the sidelink channel, the terminal device cannot simultaneously send the uplink channel and the sidelink channel. In all of the cases, a sending latency of the terminal device is increased.

In view of this, the technical solutions in the embodiment of this application are provided. In the embodiments of this application, if S signals overlap in time domain, M signals may be selected from the S signals based on the maximum transmit power of the terminal device and priorities of the S signals, for sending. This is equivalent to selecting the M signals from the S signals based on a priority sequence, for simultaneous sending. In addition, the S signals include a sidelink signal. In this case, if M is greater than 2, a plurality of signals in the M signals may be sidelink signals. It can be learned that, in the embodiments of this application, a plurality of sidelink signals may be simultaneously sent, thereby resolving a current problem. Alternatively, the S signals may include a sidelink signal and an uplink signal. In this case, the M signals may also include a sidelink signal and an uplink signal. That is, the sidelink signal and the uplink signal may be simultaneously sent, thereby resolving a problem that currently a sidelink signal and an uplink signal cannot be simultaneously sent. Moreover, a signal is selected for sending based on a priority, and a signal with a higher priority can be preferentially sent, so that a sending success rate of the signal with the higher priority is improved as much as possible.

The technical solutions provided in the embodiments of this application may be applied to a V2X scenario, which may be an NR V2X scenario, an LTE V2X scenario, or the like, or may be applied to another scenario or another communications system. This is not specifically limited.

Figure 8:
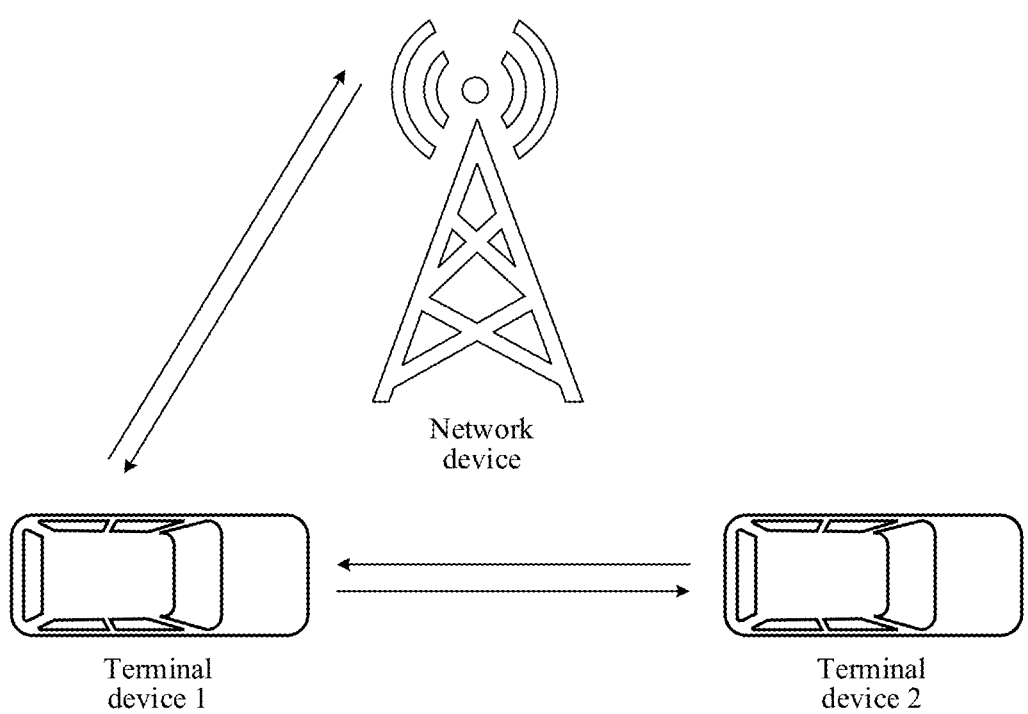
FIG. 8 is a schematic diagram of an application scenario according to an embodiment of this application.

The following describes a network architecture to which the embodiments of this application are applied. FIG. 8 shows a network architecture to which the embodiments of this application are applied.

FIG. 8 includes a network device and two terminal devices, which are respectively a terminal device 1 and a terminal device 2. Both the two terminal devices may be connected to the network device. Alternatively, in the two terminal devices, only the terminal device 1 may be connected to the network device, and the terminal device 2 is not connected to the network device. The two terminal devices may also communicate with each other by using a sidelink; in other words, the terminal device 1 is a terminal device with network coverage, and the terminal device 2 is a terminal device with partial network coverage. FIG. 8 uses an example in which only the terminal device 1 is connected to the network device. Certainly, a quantity of terminal devices in FIG. 8 is merely an example. During actual application, the network device may provide services for a plurality of terminal devices.

The network device in FIG. 8 is, for example, an access network device such as a base station. The access network device corresponds to different devices in different systems. For example, the access network device may correspond to an eNB in a fourth generation mobile communications technology (the $4^{th}$ generation, 4G) system, and correspond to a 5G access network device, for example, a gNB, in a 5G system.

An example in which the terminal device in FIG. 8 is a vehicle-mounted terminal device or a vehicle is used. However, the terminal device in the embodiments of this application is not limited thereto.

With reference to the accompanying drawings, the following describes the technical solutions provided in the embodiments of this application.

Figure 9:
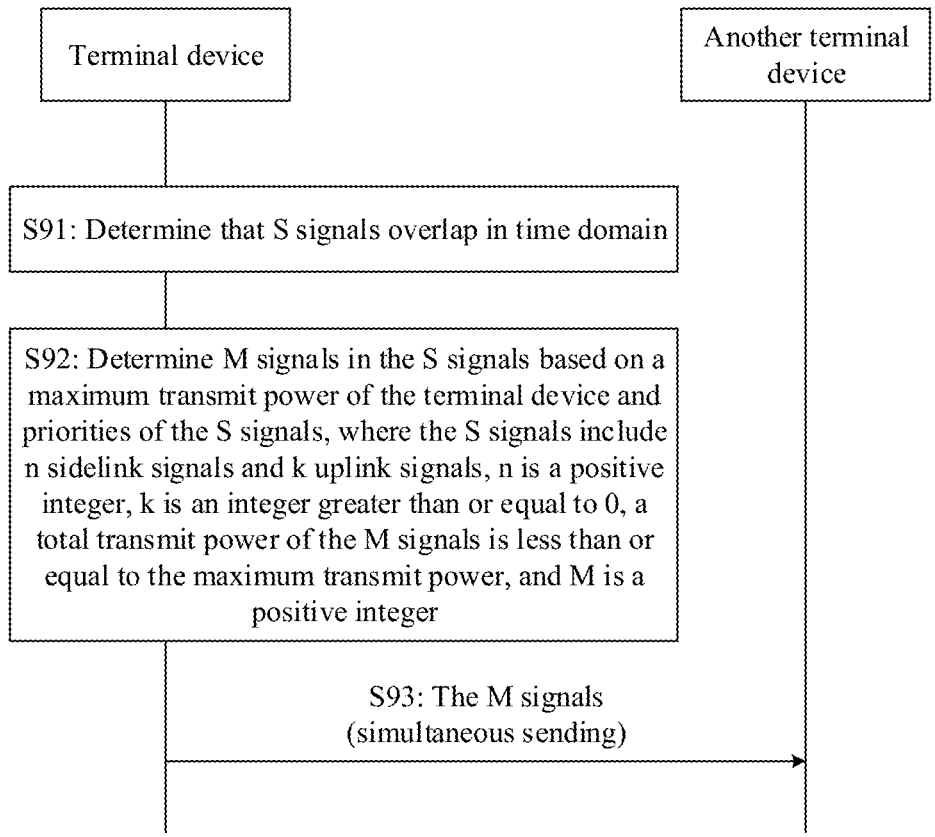
FIG. 9 is a flowchart of a signal sending and priority configuration method according to an embodiment of this application.

An embodiment of this application provides a signal sending and priority configuration method. FIG. 9 is a flowchart of the method. The following description uses an example in which the method is applied to the network architecture shown in FIG. 8. In addition, the method may be performed by two or three communications apparatuses. If the method is performed by two communications apparatuses, the two communications apparatuses are, for example, a first communications apparatus and a second communications apparatus. If the method is performed by three communications apparatuses, the three communications apparatuses are, for example, a first communications apparatus, a second communications apparatus, and a third communications apparatus. The first communications apparatus, the second communications apparatus, or the third communications apparatus may be a network device or a communications apparatus that can support a network device in implementing a function required by the method, or may be a terminal device or a communications apparatus that can support a terminal device in implementing a function required by the method. Certainly, the first communications apparatus, the second communications apparatus, or the third communications apparatus may alternatively be another communications apparatus, for example, a chip system. In addition, implementations of the first communications apparatus, the second communications apparatus, and the third communications apparatus are not limited. For example, the three communications apparatuses may be implemented in a same form. For example, the three communications apparatuses are implemented in a form of a device. Alternatively, the three communications apparatuses may be implemented in different forms. For example, the first communications apparatus is implemented in a form of a device, and the second communications apparatus and the third communications apparatus are implemented in a form of a chip system. For example, the network device is a base station.

For ease of description, the following uses an example in which the method is performed by a network device and a terminal device, or performed by terminal devices, or performed by a network device and two terminal devices. To be specific, the following example is used: The first communications apparatus is a network device, and the second communications apparatus is a terminal device; both the first communications apparatus and the second communications apparatus are terminal devices; or the first communications apparatus is a network device, and both the second communications apparatus and the third communications apparatus are terminal devices. For example, this embodiment is applied to the network architecture shown in FIG. 8. Therefore, the network device described below may be the network device in the network architecture shown in FIG. 8, the terminal device described below may be the terminal device 1 in the network architecture shown in FIG. 8, and another terminal device described below may be the terminal device 2 in the network architecture shown in FIG. 8.

S91: The terminal device determines that S signals overlap in time domain, where S is an integer greater than or equal to 2.

S92: The terminal device determines M signals in the S signals based on a maximum transmit power of the terminal device and priorities of the S signals, where the S signals include n sidelink signals and k uplink signals, n is a positive integer, k is an integer greater than or equal to 0, a total transmit power of the M signals is less than or equal to the maximum transmit power, and M is a positive integer.

S93: The terminal device simultaneously sends the M signals, and the another terminal device receives the M signals, or the network device and the another terminal device receive the M signals.

FIG. 9 uses an example in which the another terminal device receives the M signals and there is one such a terminal device. In practice, if the another terminal device receives the M signals, there may be one or more such terminal devices. In other words, M sidelink signals may be sent to one terminal device, or may be sent to a plurality of terminal devices. Alternatively, if the network device and the another terminal device receive the M signals, similarly, there may be one or more such terminal devices, that is, a remaining sidelink signal in the M signals other than an uplink signal sent to the network device may be sent to one terminal device, or may be sent to a plurality of terminal devices.

In this embodiment of this application, the sidelink signal and the uplink signal may be understood as two types of signals. A signal of a sidelink signal type may include a signal carried on a sidelink channel, and a signal of an uplink signal type may include at least one of a signal or a sounding reference signal (SRS) carried on an uplink channel. In this case, in this embodiment of this application, that the S signals include the sidelink signal may be understood as that the S signals include a signal of the sidelink signal type. For brevity, this is described as that the S signals include the sidelink signal in this specification. Similarly, that the S signals include the uplink signal may be understood as that the S signals include a signal of the uplink signal type. For brevity, this is described as that the S signals include the uplink signal in this specification. That the S signals include the uplink signal may mean that the S signals include a signal or an SRS carried on an uplink channel, or the S signals include a signal and an SRS carried on an uplink channel. In this embodiment of this application, the maximum transmit power of the terminal device is represented by, for example, P, and includes but is not limited to the following implementations:

A. The maximum transmit power of the terminal device is a maximum transmit power supported by a capability of the terminal device, and is represented by, for example, $P_{powerclass}$.

B. The maximum transmit power of the terminal device is a maximum transmit power $P_{EMAX}$ configured by the network device for the terminal device.

C. The maximum transmit power of the terminal device is a maximum transmit power determined by the terminal device based on a maximum transmit power supported by a capability of the terminal device and a maximum transmit power configured by the network device for the terminal device, and is represented by, for example, $P_{CMAX}$.

In S91, when needing to send the S signals, the terminal device determines that the S signals overlap in time domain. That the S signals overlap in time domain may also be understood as that the terminal device needs to simultaneously send the S signals. The S signals may completely overlap in time domain. For example, start positions and end positions of the S signals are completely the same. Alternatively, the S signals may partially overlap in time domain. For example, two signals partially overlap, which, for example, is understood that at least one same orthogonal frequency division multiplexing (OFDM) symbol is occupied by the two signals.

Figure 10A:
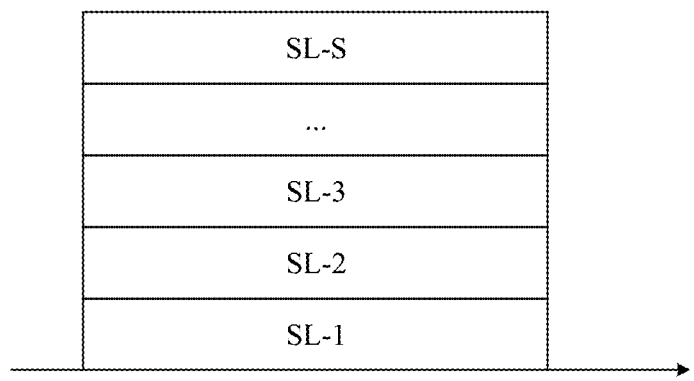
FIG. 10A is a schematic diagram of simultaneous sending of S sidelink signals according to an embodiment of this application.

The S signals may include only the sidelink signal, that is, k=0. In this case, in addition to the n sidelink signals, the S signals may further include another signal. Certainly, the S signals may not include another signal, but include only the n sidelink signals. Referring to FIG. 10A, a horizontal axis represents a time, and a vertical axis represents a frequency in FIG. 10A. FIG. 10A uses an example in which the S signals are all sidelink signals. SL-1 to SL-S in FIG. 10A represent the S sidelink signals. FIG. 10A also uses an example in which the S signals completely overlap in time domain. In addition, in FIG. 10A, a frequency domain position of the sidelink signal is merely an example. During actual application, the S signals may include another signal in addition to the sidelink signal, and the S signals may not necessarily completely overlap in time domain, but may partially overlap.

Figure 10B:
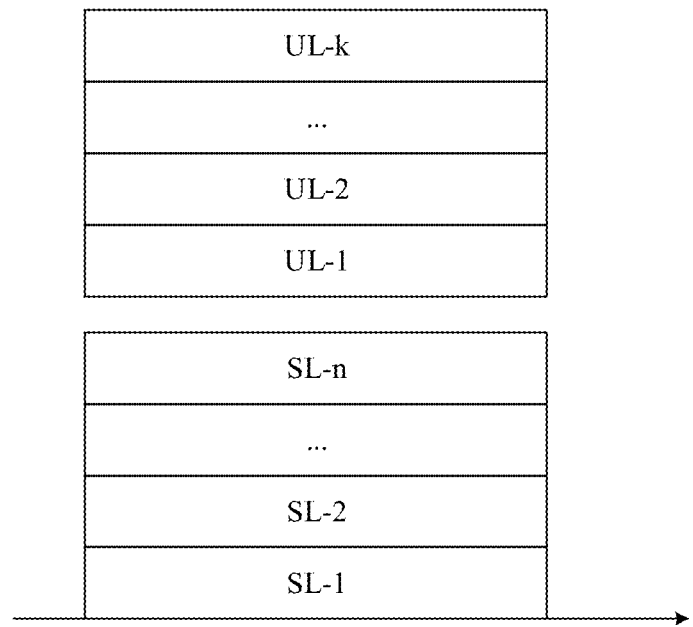
FIG. 10B is a schematic diagram of simultaneous sending of S signals according to an embodiment of this application, where the S signals include n sidelink signals and k uplink signals.

Alternatively, the S signals may include the sidelink signal and the uplink signal, that is, k is not equal to 0. In this case, the S signals may include only the n sidelink signals and the k uplink signals, but do not include another signal. Alternatively, in addition to the n sidelink signals and the k uplink signals, the S signals may further include another signal. This is not specifically limited. Referring to FIG. 10B, a horizontal axis represents a time, and a vertical axis represents a frequency in FIG. 10B. FIG. 10B uses an example in which the S signals include only then sidelink signals and the k uplink signals. SL-1 to SL-n in FIG. 10B represent the n sidelink signals, and UL-1 to UL-k represent the k uplink signals. FIG. 10B also uses an example in which the S signals completely overlap in time domain. In addition, in FIG. 10B, frequency domain portions of the sidelink signal and the uplink signal are merely examples. During actual application, the S signals may include another signal in addition to the sidelink signal and the uplink signal, and the S signals may not necessarily completely overlap in time domain, but may partially overlap.

The sidelink channel may include at least one of a physical sidelink broadcast channel (PSBCH), a PSFCH, a PSDCH, a PSCCH, or a physical sidelink data channel, and certainly may further include another sidelink channel. The physical sidelink data channel is, for example, a PSSCH. Alternatively, the uplink channel may include at least one of a physical random access channel (PRACH), a physical broadcast channel (PBCH), a physical uplink control channel (PUCCH), or a physical uplink shared channel (PUSCH), and certainly may further include another uplink channel.

In this embodiment of this application, the terminal device may first determine a transmit power of a to-be-sent signal. For example, this step is performed before S91.

In an implementation, the terminal device determines that there are S to-be-sent signals, and the terminal device may independently determine a transmit power of each of the S signals or obtain a transmit power of each of the S signals from a base station. In this case, the terminal device does not need to learn of a priority of a signal in advance, but only needs to directly determine the transmit powers of all of the to-be-sent S signals, and then determine the M signals in the S signals according to steps S91 to S93 in this embodiment of this application. In this case, the terminal device needs to determine a relatively large quantity of transmit powers, but an operation is simple and has low complexity.

Alternatively, in another implementation, the terminal device determines that there are S to-be-sent signals, and the terminal device may first determine a transmit power of a signal with a highest priority in the S signals based on priorities of the signals. For example, the signal with the highest priority in the S signals is a signal 1. In this case, the terminal device first determines a transmit power of the signal 1 (certainly, if a plurality of signals in the S signals have a same priority and all have a highest priority, the terminal device may first determine a transmit power of each of the plurality of signals with the highest priority). After determining the transmit power of the signal 1, the terminal device determines whether the transmit power of the signal 1 is equal to the maximum transmit power of the terminal device. If the transmit power of the signal 1 is equal to the maximum transmit power of the terminal device, the terminal device may determine that M=1, that is, the terminal device sends only the signal 1.

If the transmit power of the signal 1 is less than the maximum transmit power of the terminal device, the terminal device determines the transmit power of the signal with the highest priority in the signals other than the signal 1 in the S signals. For example, if the signal with the highest priority in the S signals other than the signal 1 is a signal 2, the terminal device determines a transmit power of the signal 2 (certainly, if a plurality of signals other than the signal 1 in the S signals have a same priority, and all have a highest priority, the terminal device may first determine a transmit power of each of the plurality of signals). After determining the transmit powers of the signal 1 and the signal 2, the terminal device determines whether a total transmit power of the signal 1 and the signal 2 is greater than the maximum transmit power of the terminal device. If the total transmit power of the signal 1 and the signal 2 is greater than the maximum transmit power of the terminal device, the terminal device may determine that M=1, that is, the terminal device may send only the signal 1 but not send the signal 2. Alternatively, if the total transmit power of the signal 1 and the signal 2 is greater than the maximum transmit power of the terminal device, the terminal device may determine that M=1, and the M signals are the signal 1 in this case, but the terminal device may send the signal 1 and the signal 2. However, when sending the signal 2, the terminal device needs to reduce the power for sending, that is, the power for sending the signal 2 is less than a transmit power required by the signal 2. Alternatively, if the total transmit power of the signal 1 and the signal 2 is equal to the maximum transmit power of the terminal device, the terminal device may determine that M=2, that is, the terminal device may send the signal 1 and the signal 2.

However, if the total transmit power of the signal 1 and the signal 2 is less than the maximum transmit power of the terminal device, the terminal device determines the transmit power of the signal with the highest priority, for example, a transmit power of a signal 3, in the signals other than the signal 1 and the signal 2 in the S signals, and continues to compare the transmit powers. The rest may be deduced by analogy. In this case, the terminal device may not need to determine the transmit power of each of the S signals, but only needs to determine transmit powers of some of the S signals. The terminal device needs to determine a relatively small quantity of transmit powers, thereby helping reduce power consumption caused by calculating the transmit power by the terminal device.

For a specific manner of determining the transmit power of the signal by the terminal device, refer to the foregoing manner of calculating the transmit power of the PSSCH or the PSCCH by the terminal device, or refer to a prior-art manner of calculating a transmit power of an uplink channel by the terminal device.

In S91, the terminal device may determine the M signals in the S signals based on the maximum transmit power of the terminal device and the priorities of the S signals, provided that the terminal device determines that the S signals overlap in time domain. Alternatively, the terminal device may determine that the S signals overlap in time domain, and when determining that the total transmit power of the S signals is greater than the maximum transmit power of the terminal device, determine the M signals in the S signals based on the maximum transmit power of the terminal device and the priorities of the S signals. However, if the total transmit power of the S signals is less than or equal to the maximum transmit power of the terminal device, the terminal device may directly send the S signals based on the transmit power of each signal. If the total transmit power of the S signals is greater than the maximum transmit power of the terminal device, the terminal device may not support simultaneous sending of the S signals. In view of this, this embodiment of this application proposes that the terminal device may select the M signals from the S signals based on the priorities of the signals. In this way, it can be ensured as much as possible that a high-priority signal can be sent.

The priority of the signal is mentioned above, and the following describes a manner of determining the priority of the signal that is provided in this embodiment of this application.

In this embodiment of this application, the priorities of the S signals may be determined based on a priority criterion. In this embodiment of this application, a priority sequence of the S signals, instead of a specific priority of each of the S signals, may be determined based on the priority criterion. That is, the priority of the signal described in this specification may be understood as a priority ranking of the signal. For example, if the S signals include a signal 1, a signal 2, and a signal 3, a priority sequence of the three signals may be determined based on the priority criterion as: a priority of the signal 1>a priority of the signal 2>a priority of the signal 3. However, specific respective priorities of the signal 1, the signal 2, and the signal 3 may not be determined based on the priority criterion. The priority criterion may be specified in a protocol; or the priority criterion may be determined by the network device and then sent to the terminal device, and the terminal device only needs to receive the priority criterion from the network device.

For example, the priority criterion may include at least one of a first priority criterion, a second priority criterion, a third priority criterion, a fourth priority criterion, a fifth priority criterion, a sixth priority criterion, a seventh priority criterion, or an eighth priority criterion.

The first priority criterion may be that a priority of an uplink channel is higher than a priority of a sidelink channel. This is because the uplink channel is used for communication between the terminal device and the network device, and the sidelink channel is used only for communication between terminal devices. The network device maintains communication with a plurality of terminal devices, and needs to coordinate a conflict of communication links to the plurality of terminal devices. A scheduling algorithm is very complex. If the priority of the uplink channel is higher than the priority of the sidelink channel, complexity of an entire system can be reduced, and smooth cellular communication can be ensured. In the first priority criterion, a priority of any uplink channel is higher than that of a sidelink channel. For example, a priority of a PUSCH is higher than a priority of a PSCCH.

The second priority criterion may be that a priority of a broadcast channel is higher than a priority of a multicast channel or a unicast channel. This is because a quantity of receiving terminal devices is not limited in broadcast communication, but a quantity of receiving terminal devices in multicast communication or unicast communication is limited. From a perspective of a quantity of audiences, if the priority of the broadcast channel is higher than the priority of the multicast channel or the unicast channel, smooth communication of more terminal devices can be ensured. In the second priority criterion, an uplink channel or a sidelink channel is not distinguished. A priority of any broadcast channel is higher than that of a multicast channel, and is also higher than that of a unicast channel. For example, a priority of a sidelink broadcast channel is higher than a priority of a sidelink multicast channel, and is also higher than a priority of a sidelink unicast channel; a priority of an uplink broadcast channel is higher than a priority of an uplink multicast channel, and is also higher than a priority of an uplink unicast channel; and the priority of the sidelink broadcast channel is higher than the priority of the uplink multicast channel, and is also higher than the priority of the uplink unicast channel.

The third priority criterion may be that a priority of a multicast channel is higher than a priority of a unicast channel. Similarly, this is because a quantity of receiving terminal devices in multicast communication is greater than a quantity of receiving terminal devices in unicast communication. From a perspective of a quantity of audiences, if the priority of the multicast channel is higher than the priority of the unicast channel, smooth communication of more terminal devices can be ensured. In the third priority criterion, an uplink channel or a sidelink channel is not distinguished. A priority of any multicast channel is higher than that of a unicast channel. For example, a priority of a sidelink multicast channel is higher than a priority of a sidelink unicast channel; a priority of an uplink multicast channel is higher than a priority of an uplink unicast channel; and the priority of the sidelink multicast channel is higher than the priority of the uplink unicast channel.

The fourth priority criterion may be that a priority of an LTE channel is higher than a priority of an NR channel. This is because an LTE V2X standard has been formulated into a protocol and is relatively stable. In consideration of backward compatibility, an LTE power should not be reduced, and an NR power can be reduced to ensure that a total power is less than the maximum transmit power. In the fourth priority criterion, an uplink channel or a sidelink channel is not distinguished. A priority of any LTE channel is higher than that of an NR channel. For example, a priority of an LTE PSCCH is higher than a priority of an NR PSCCH; a priority of an LTE PSSCH is higher than a priority of an NR PSSCH; and a priority of an LTE PSFCH is also higher than a priority of an NR PSFCH.

The fifth priority criterion may be that a priority of a control channel is higher than a priority of a data channel. This is because the control channel carries information about the data channel, and if the control channel cannot be correctly received, demodulation and decoding cannot be performed on the corresponding data channel. In the fifth priority criterion, an uplink channel or a sidelink channel is not distinguished. A priority of any control channel is higher than that of a data channel. For example, a priority of a PUCCH is higher than a priority of a PUSCH; a priority of a PSCCH is higher than a priority of a PSSCH; and the priority of the PSCCH is also higher than the priority of the PUSCH. This criterion may also be extended into that a priority of a channel including control information is higher than a priority of a channel not including control information. For example, a priority of a PSSCH carrying sidelink control information SCI or sidelink feedback information (SFCI) is higher than a priority of a PSSCH not carrying SCI or SFCI but carrying only pure data.

The sixth priority criterion may be that a priority of a feedback channel is higher than a priority of a data channel. Because the feedback channel corresponds to whether data that is sent previously needs to be retransmitted, the priority of the feedback channel is higher than a priority of data that needs to be newly transmitted currently. In the sixth priority criterion, an uplink channel or a sidelink channel is not distinguished. A priority of any feedback channel is higher than that of a data channel. For example, a priority of a PSFCH is higher than a priority of a PSSCH, and the priority of the PSFCH is also higher than a priority of a PUSCH.

The seventh priority criterion may be that a priority of a discovery channel is higher than a priority of a data channel. This is because the discovery channel is used to establish an initial connection. In the seventh priority criterion, an uplink channel or a sidelink channel is not distinguished. A priority of any discovery channel is higher than that of a data channel. For example, a priority of a PSDCH is higher than a priority of a PSSCH, and the priority of the PSDCH is also higher than a priority of a PUSCH.

The eighth priority criterion may be that a priority of a control channel, a feedback channel, a discovery channel, or a data channel is higher than a priority of an SRS. This is because the SRS is used to listen to an uplink channel, and when the uplink channel does not change greatly, the uplink channel does not need to be listened to frequently. In the eighth priority criterion, an uplink channel or a sidelink channel is not distinguished. A priority of any control channel, feedback channel, discovery channel, or data channel is higher than a priority of an SRS. For example, a priority of a PUCCH is higher than a priority of an SRS; a priority of a PSCCH is higher than the priority of the SRS; a priority of a PSFCH is higher than the priority of the SRS; a priority of a PSDCH is higher than the priority of the SRS; a priority of a PUSCH is higher than the priority of the SRS; and a priority of the PSSCH is higher than the priority of the SRS.

When the priority of the signal is determined, the priority of a channel on which the signal is located is used as the priority of the signal. It should be noted that a PUSCH may carry uplink control information (UCI), or may not carry UCI. If the PUSCH carries UCI, the PUSCH may be considered as a control channel. If the PUSCH does not carry UCI, the PUSCH may be considered as a data channel. The foregoing manner is relatively simple for determining a priority of a signal. If a signal is UCI and is carried on a PUSCH, a priority of the PUSCH may be considered as a priority of a control channel; and if a priority of data carried on the PUSCH needs to be determined, the priority of the PUSCH may be considered as a priority of a data channel.

In addition, a plurality of priority criteria are described above, and the priority criterion in this embodiment of this application may include one or more of the priority criteria. If the priority criterion includes the plurality of priority criteria, when these priority criteria are used in different sequences, in other words, when use priorities are different, obtained results are also different. For example, the priority criterion includes the first priority criterion and the fourth priority criterion. If the first priority criterion is first used, a priority of a PUSCH is higher than a priority of a PSCCH. If the fourth priority criterion is first used, a priority of a PUSCH is lower than a priority of a PSCCH. To avoid disorder, in this embodiment of this application, each of the at least one priority criterion may correspond to one use priority, and the use priority indicates a use ranking of the corresponding priority criterion when the corresponding priority criterion is used to determine the M signals, in other words, indicates a use ranking of the corresponding priority criterion when the corresponding priority criterion is used to determine the priority of each of the S signals. For example, the priority criterion includes the first priority criterion and the fourth priority criterion, the use priority of the first priority criterion is a first use priority, the use priority of the fourth priority criterion is a second use priority, and the first use priority is higher than the second use priority. In this case, it indicates that the first priority criterion should be first used, and then the fourth priority criterion is used, and for a PUSCH and a PSCCH, a priority of the PUSCH is higher than a priority of the PSCCH. It can be learned that, setting of the use priority for the criterion can reduce as much as possible disorder that may occur when the priority of the signal is determined.

It should be noted that the "use priority" herein and the "priority of the signal" or the "priority of the channel" described above are different concepts. The use priority is specific to a criterion, the priority of the signal is specific to a signal, and the priority of the channel is specific to a channel. Certainly, the priority of the channel may also be considered as the priority of the signal in the embodiments of this application. The use priority of the criterion may be specified in a protocol; or the use priority of the criterion may be determined by the network device and sent to the terminal device, and the terminal device only needs to receive the use priority from the network device. When the terminal device determines the priorities of the S signals, if a sequence of used priority criteria does not affect a priority sorting result, the terminal device may not consider the use priority of the priority criterion. However, if the sequence of the used priority criteria affects the priority sorting result, the priority of the signal needs to be determined based on the use priority of the priority criterion. Alternatively, the priority of the signal may be determined based on the use priority of the priority criterion regardless of whether the sequence of the used priority criteria affects the priority sorting result.

For a sidelink signal, for example, the priority criterion includes the second priority criterion, the fourth priority criterion, the fifth priority criterion, and the sixth priority criterion. For sidelink channels such as a PSBCH, a PSFCH, a PSDCH, a PSCCH, and a PSSCH, a priority sequence may be: PSBCH>PSFCH>PSDCH>PSCCH>PSSCH, PSBCH>PSFCH>PSCCH>PSDCH>PSSCH, PSBCH>PSDCH>PSFCH>PSCCH>PSSCH, and so on. Priorities of a control channel, a feedback channel, and a discovery channel are not forcibly specified. Therefore, obtained priority sorting results may be different. Alternatively, the priority criterion may further include another priority criterion, used to specify priorities of at least two of a control channel, a feedback channel, or a discovery channel. In this case, the priority criterion may be further considered when the priority of the signal is determined. Therefore, if the S signals include only the sidelink signal, the priority of the signal may be determined based on the another priority criterion.

For a sidelink signal and an uplink signal, for example, the priority criterion includes the first priority criterion, the second priority criterion, the third priority criterion, the fourth priority criterion, the fifth priority criterion, the sixth priority criterion, the seventh priority criterion, and the eighth priority criterion. For example, for a PRACH, a PSBCH, a PUCCH, a PUSCH with UCI, a PSFCH, a PSDCH, a PSCCH, a PUSCH without UCI, a PSSCH, and an SRS, a priority sequence may be: PRACH>PSBCH>PUCCH>PUSCH with UCI>PSFCH>PSDCH>PSCCH>PUSCH without UCI>PSSCH>SRS. It can be learned that, the prerequisite for such a sequence is that the use priority of the second priority criterion is higher than the use priority of the first priority criterion. Alternatively, a priority sequence of the PRACH, the PSBCH, the PUCCH, the PUSCH with UCI, the PSFCH, the PSDCH, the PSCCH, the PUSCH without UCI, the PSSCH, and the SRS may be: PRACH>PUCCH>PSBCH>PUSCH with UCI>PSFCH>PSDCH>PSCCH>PUSCH without UCI>PSSCH>SRS. Alternatively, a priority sequence of the PRACH, the PSBCH, the PUCCH, the PUSCH with UCI, the PSFCH, the PSDCH, the PSCCH, the PUSCH without UCI, the PSSCH, and the SRS may be: PRACH>PUCCH>PSBCH>PSDCH>PUSCH with UCI>PSFCH>PSCCH>PUSCH without UCI>PSSCH>SRS. Alternatively, a priority sequence of the PRACH, the PSBCH, the PUCCH, the PUSCH with UCI, the PSFCH, the PSDCH, the PSCCH, the PUSCH without UCI, the PSSCH, and the SRS may be: PRACH>PUCCH>PUSCH with UCI>PUSCH without UCI>PSBCH>PSDCH>PSFCH>PSCCH>PSSCH>SRS. It can be learned that, the prerequisite for such a sequence is that the use priority of the first priority criterion is higher than a use priority of another priority criterion.

The foregoing priority sorting is merely an example. Sorting results obtained based on one or more priority criteria provided in this embodiment of this application all fall within the protection scope of this embodiment of this application.

In this embodiment of this application, priorities of signals may be used to determine signals to be sent and signals that are not to be sent. Especially when a power is limited, for example, when a total power of signals that need to be sent is greater than the maximum transmit power, priorities of the signals may be used to ensure that a high-priority signal can be sent by using a sufficient power. The priorities of the signals may be used to determine signals that need to be sent when the power is limited. In view of this, the priority of the signal may be understood as a priority used for power control, or understood as a priority used to reduce a transmit power of a signal (some signals may be sent in a manner of reducing transmit powers, and when the transmit power is reduced to 0, it indicates that the signal is not sent).

In this embodiment of this application, the M signals may be signals whose priorities are higher than priorities of remaining S−M signals in the S signals. The remaining signals herein refer to signals other than the M signals in the S signals, that is, the S−M signals. This may be understood as that a priority of a signal with a lowest priority in the M signals is also higher than a priority of a signal with a highest priority in the S−M signals, or understood as that a priority of each of the M signals is higher than priorities of the S−M signals. If the total transmit power of all of the S signals is greater than the maximum transmit power of the terminal device, the total transmit power of the M signals determined by the terminal device may be less than or equal to the maximum transmit power of the terminal device. It may be understood that if the total transmit power of all of the S signals is excessively large, the terminal device may select some signals from the S signals for simultaneous sending, and a total transmit power of these signals needs to be less than the maximum transmit power of the terminal device, to ensure that these signals can be normally sent.

To fully use a transmit power of the terminal device to enable the terminal device to send more signals at a time, the terminal device may determine M based on a principle of exhausting the maximum transmit power of the terminal device as much as possible. For example, the terminal device determines G signals in the S signals, where a total transmit power of all of the G signals is less than or equal to the maximum transmit power of the terminal device. If the total transmit power of all of the G signals is equal to the maximum transmit power of the terminal device, the G signals are the M signals, and G=M. If the total transmit power of all of the G signals is less than the maximum transmit power of the terminal device, the terminal device continues to determine X signals in S−G signals, where the X signals have a same priority, and the priorities of the X signals are greater than priorities of S−G−X signals. If a total transmit power of all of G+X signals is equal to the maximum transmit power of the terminal device, G+X=M. If the total transmit power of all of the G+X signals is greater than the maximum transmit power of the terminal device, G=M. For example, G=1, and the signal is referred to as the first signal. In this case, the total transmit power of the M signals and the first signal may be greater than the maximum transmit power of the terminal device, and the first signal is the signal with the highest priority in the S−M signals other than the M signals in the S signals. In this manner, a maximum of M signals can be simultaneously sent as much as possible (it may be understood that if one more signal is selected, a total transmit power of all of the selected signals is greater than the maximum transmit power of the terminal device; therefore, M is a maximum quantity of signals that can be selected), to fully use the transmit power of the terminal device.

After selecting the M signals, or when or after simultaneously sending the M signals, the terminal device may discard the S−M signals (that is, the transmit powers of these signals are 0) other than the M signals in the S signals. Alternatively, if the total transmit power of all of the M signals is less than the maximum transmit power of the terminal device, in addition to the M signals, the terminal device may send the first signal. For example, the terminal device may send the first signal by using a remaining transmit power of the terminal device. The remaining transmit power may be a transmit power remaining after the total transmit power of all of the M signals is subtracted from the maximum transmit power of the terminal device. In this way, the transmit power of the terminal device can be fully better used. Certainly, in this case, the remaining transmit power is less than a transmit power required by the first signal. In other words, the first signal can be sent only by using a relatively low transmit power. However, although a probability that the first signal is successfully sent by using the relatively low transmit power is reduced, there is still a possibility that the first signal can be successfully sent. Compared with discarding the first signal, sending the first signal by using the relatively low transmit power can at least ensure that the first signal can be sent. If the first signal is sent by using the remaining transmit power, the M signals and the first signal may be simultaneously sent.

In this embodiment of this application, the terminal device may select the M signals from the S signals in descending order of the priorities. For example, if the terminal device determines the transmit power of each of the S signals, and determines that the total transmit power of all of the S signals is greater than the maximum transmit power of the terminal device, the terminal device may select the M signals from the S signals. For example, the terminal device may sequentially select the M signals based on the priorities of the S signals. Each time the terminal device selects a signal, the terminal device determines whether a total transmit power of all selected signals is greater than or equal to the maximum transmit power of the terminal device. If the total transmit power of all the selected signals is greater than or equal to the maximum transmit power of the terminal device, the selection process is stopped, and currently selected signals are the M signals. If the total transmit power of all the selected signals is less than the maximum transmit power of the terminal device, selection may continue, and determining may be performed after another signal is selected, and so on.

For example, the S signals include three signals in total: a signal 1, a signal 2, and a signal 3. For example, the signal 1 is a signal carried on a PSFCH or a signal carried on a PUCCH; the signal 2 is a signal carried on a PSCCH; and the signal 3 is a signal carried on a PSSCH. For example, a sequence of priorities of the three signals is: the priority of the signal 1>the priority of the signal 2>the priority of the signal 3. In this case, the terminal device separately determines transmit powers of the signal 1, the signal 2, and the signal 3. If a total transmit power of the signal 1, the signal 2, and the signal 3 is less than or equal to the maximum transmit power of the terminal device, the terminal device may determine to simultaneously send the signal 1, the signal 2, and the signal 3. Alternatively, if a total transmit power of the signal 1, the signal 2, and the signal 3 is greater than the maximum transmit power of the terminal device, the terminal device may perform selection. Based on the sequence of the priorities, the terminal device first determines whether the transmit power of the signal 1 is greater than the maximum transmit power of the terminal device.

1. If the transmit power of the signal 1 is greater than or equal to the maximum transmit power of the terminal device, the terminal device may determine to send only the signal 1. In this case, M=1. In addition, if the transmit power of the signal 1 is greater than the maximum transmit power of the terminal device, the terminal device can send the signal 1 only based on the maximum transmit power of the terminal device. This is equivalent to describing that the signal 1 cannot be sent based on a requirement of the signal 1.

2. Alternatively, if the transmit power of the signal 1 is greater than the maximum transmit power of the terminal device, the terminal device does not send the signal 1, the signal 2, or the signal 3. In other words, none of the three signals is sent. For example, the signal 1, the signal 2, and the signal 3 may be discarded. In this case, M=0.

3. If the transmit power of the signal 1 is less than the maximum transmit power of the terminal device, the terminal device may further select the signal 2, and determine whether a total transmit power of the signal 1 and the signal 2 is greater than or equal to the maximum transmit power of the terminal device. If the total transmit power of the signal 1 and the signal 2 is greater than or equal to the maximum transmit power of the terminal device, the terminal device may determine to send only the signal 1 but not to send the signal 2. For example, the signal 2 and the signal 3 may be discarded. In this case, M=1.

4. Alternatively, if a total transmit power of the signal 1 and the signal 2 is greater than the maximum transmit power of the terminal device, the terminal device may send the signal 1 based on a transmit power required by the signal 1, and send the signal 2 based on a remaining transmit power obtained by subtracting the transmit power of the signal 1 from the maximum transmit power of the terminal device. This is equivalent to describing that the signal 1 can be sent based on a power requirement of the signal 1, but the signal 2 cannot be sent based on a power requirement of the signal 2. However, compared with discarding the signal 2, at least it can be ensured that the signal 2 can be sent.

5. If a total transmit power of the signal 1 and the signal 2 is less than the maximum transmit power of the terminal device, the terminal device may further select the signal 3, and determine whether the total transmit power of the signal 1, the signal 2, and the signal 3 is greater than or equal to the maximum transmit power of the terminal device. If the total transmit power of the signal 1, the signal 2, and the signal 3 is greater than or equal to the maximum transmit power of the terminal device, the terminal device may determine to send only the signal 1 and the signal 2 but not to send the signal 3. For example, the signal 3 may be discarded. In this case, M=2.

6. Alternatively, if a total transmit power of the signal 1 and the signal 2 is greater than the maximum transmit power of the terminal device, the terminal device may send the signal 1 based on a transmit power required by the signal 1, send the signal 2 based on a transmit power required by the signal 2, and send the signal 3 based on a remaining transmit power obtained by subtracting the transmit powers of the signal 1 and the signal 2 from the maximum transmit power of the terminal device. This is equivalent to describing that the signal 1 and the signal 2 can be sent based on power requirements of the signal 1 and the signal 2, but the signal 3 cannot be sent based on a power requirement of the signal 3. However, compared with discarding the signal 3, at least it can be ensured that the signal 3 can be sent. A manner of determining the M signals in the S signals is deduced by analogy.

In the foregoing example, the priorities of the M signals are different. When sending the M signals, the terminal device allocates a transmit power to a high-priority signal based on a power requirement of the signal, and may send a low-priority signal based only on a remaining transmit power of the terminal device, where the remaining transmit power may be less than a power requirement of the signal. In another case, the M signals have the same priority. In this case, the transmit power of each of the M signals may be P/M, and P is the maximum transmit power of the terminal device. In other words, the transmit power may be evenly allocated to the M signals. In this case, for one of the M signals, P/M may meet a power requirement of the signal, or P/M may not meet a power requirement of the signal. Alternatively, if the M signals have the same priority, the terminal device may randomly select K signals from the M signals for simultaneous sending, where a total transmit power of all of the K signals is less than or equal to the maximum transmit power of the terminal device, a total transmit power of all of K+1 signals is greater than the maximum transmit power of the terminal device, and the additional signal may be any one of M−K signals. If the total transmit power of all of the K signals is less than the maximum transmit power of the terminal device, the terminal device may further randomly select a signal, which is referred to as, for example, a second signal, from the M−K signals, and send the second signal by using a remaining transmit power. The remaining transmit power is a transmit power remaining after transmit powers of all of the K signals are subtracted from the maximum transmit power of the terminal device. The remaining transmit power may be less than a transmit power required by the second signal. However, compared with discarding the second signal, this manner can ensure that the second signal can be sent.

In this embodiment of this application, if the S signals overlap in time domain, the M signals may be selected from the S signals based on the maximum transmit power of the terminal device and the priorities of the S signals, for sending. This is equivalent to selecting the M signals from the S signals based on a priority sequence, for simultaneous sending. In addition, the S signals include the sidelink signal. To be specific, a plurality of sidelink signals may be simultaneously sent, or the sidelink signal and the uplink signal may be simultaneously sent, thereby resolving a current problem. Moreover, a signal is selected for sending based on a priority, and a signal with a higher priority can be preferentially sent, so that a sending success rate of the signal with the higher priority is improved as much as possible.

The following describes, with reference to the accompanying drawings, apparatuses configured to implement the foregoing method in the embodiments of this application. Therefore, all the foregoing content may be used in subsequent embodiments, and repeated content is not described again.

Figure 11:
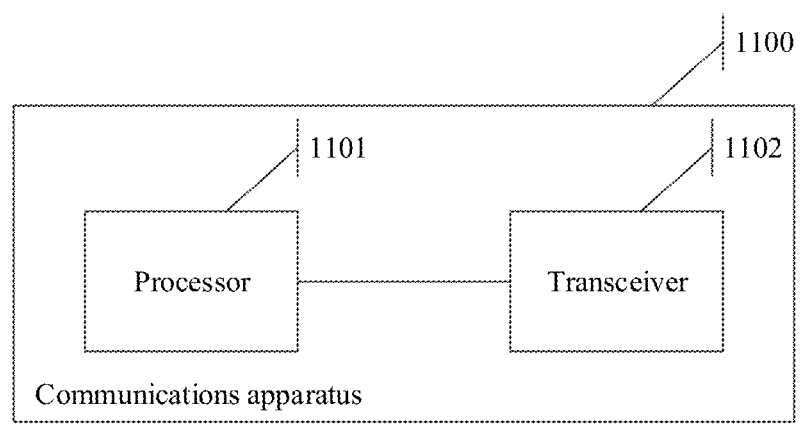
FIG. 11 is a schematic diagram of a communications apparatus that can implement a function of a terminal device according to an embodiment of this application.

FIG. 11 is a schematic structural diagram of a communications apparatus 1100. The communications apparatus 1100 may implement a function of the terminal device described above. The communications apparatus 1100 may be the terminal device described above, or may be a chip disposed in the terminal device described above. The communications apparatus 1100 may include a processor 1101 and a transceiver 1102. The processor 1101 may be configured to: perform S91 and S92 in the embodiment shown in FIG. 9, and/or support another process of the technology described in this specification, for example, may perform all or some of the foregoing processes other than the receiving and sending processes performed by the terminal device. The transceiver 1102 may be configured to: perform S93 in the embodiment shown in FIG. 9, and/or support another process of the technology described in this specification, for example, may perform all or some of the foregoing receiving and sending processes performed by the terminal device. The transceiver 1102 may include a transceiver component that communicates with a network device, and may further include a transceiver component that communicates with another terminal device.

For example, the processor 1101 is configured to determine that S signals overlap in time domain.

The processor 1101 is further configured to determine M signals in the S signals based on a maximum transmit power of the terminal device and priorities of the S signals, where the S signals include n sidelink signals and k uplink signals, n is a positive integer, k is an integer greater than or equal to 0, a total transmit power of the M signals is less than or equal to the maximum transmit power, and M is a positive integer.

The transceiver 1102 is configured to send the M signals.

In a possible implementation, the processor 1101 is configured to determine, in the following manner, the M signals in the S signals based on the maximum transmit power of the terminal device and the priorities of the S signals: when a total transmit power of the S signals is greater than the maximum transmit power, determining the M signals in the S signals based on the maximum transmit power and the priorities of the S signals.

In a possible implementation, priorities of the M signals are higher than priorities of S−M signals other than the M signals in the S signals.

In a possible implementation, a total transmit power of the M signals and a first signal is greater than the maximum transmit power, the total transmit power of the M signals is less than the maximum transmit power, and the first signal is a signal with a highest priority in the S−M signals other than the M signals in the S signals; and the transceiver 1102 is further configured to send the first signal at a remaining transmit power, where the remaining transmit power is a difference between the maximum transmit power and the total transmit power of the M signals.

In a possible implementation, the sidelink signal is a signal carried on a sidelink channel, or the uplink signal is a signal and/or an SRS carried on an uplink channel; a priority sequence of the S signals is determined based on a priority criterion; the sidelink channel includes at least one of a PBCH, a PSFCH, a PSDCH, a PSCCH, or a PSSCH; the uplink channel includes at least one of a PRACH, a PUCCH, or a PUSCH; and the priority criterion includes at least one of a first priority criterion, a second priority criterion, a third priority criterion, a fourth priority criterion, a fifth priority criterion, a sixth priority criterion, a seventh priority criterion, or an eighth priority criterion;
- the first priority criterion is that a priority of an uplink channel is higher than a priority of a sidelink channel;
- the second priority criterion is that a priority of a broadcast channel is higher than a priority of a multicast channel or a unicast channel;
- the third priority criterion is that a priority of a multicast channel is higher than a priority of a unicast channel;
- the fourth priority criterion is that a priority of an LTE channel is higher than a priority of an NR channel;
- the fifth priority criterion is that a priority of a control channel is higher than a priority of a data channel;
- the sixth priority criterion is that a priority of a feedback channel is higher than a priority of a data channel;
- the seventh priority criterion is that a priority of a discovery channel is higher than a priority of a data channel; and
- the eighth priority criterion is that a priority of a control channel, a feedback channel, a discovery channel, or a data channel is higher than a priority of an SRS.

In a possible implementation, each of the at least one priority criterion corresponds to one use priority, and the use priority is used to indicate a use ranking of the priority criterion corresponding to the use priority when the priority criterion is used to determine the M signals.

In a possible implementation, the M signals have a same priority, a transmit power of each of the M signals is P/M, and P is the maximum transmit power.

In a possible implementation,
- the maximum transmit power is a maximum transmit power supported by a capability of the terminal device; or
- the maximum transmit power is a maximum transmit power configured by a network device for the terminal device; or
- the maximum transmit power is a maximum transmit power determined by the terminal device based on a maximum transmit power supported by a capability of the terminal device and a maximum transmit power configured by a network device for the terminal device.

In a possible implementation, M=S, and the total transmit power of the S signals is less than or equal to the maximum transmit power.

All content related to the steps in the foregoing method embodiments may be cited in function descriptions of corresponding functional modules. Details are not described herein again.

Figure 12:
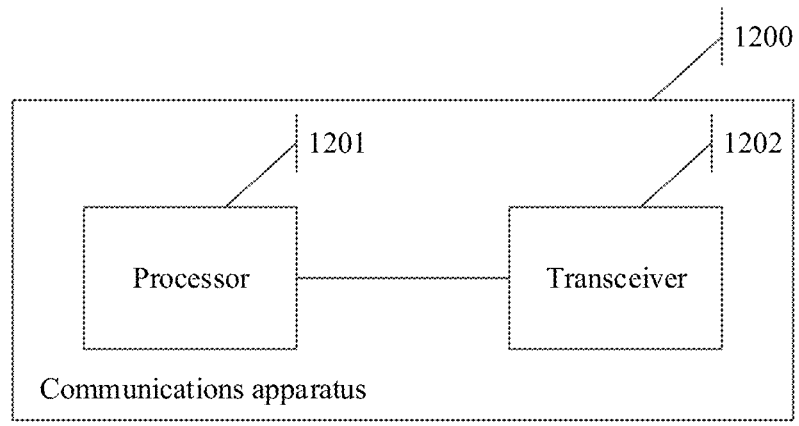
FIG. 12 is a schematic diagram of a communications apparatus that can implement a function of a network device according to an embodiment of this application.

FIG. 12 is a schematic structural diagram of a communications apparatus 1200. The communications apparatus 1200 may implement a function of the second terminal device described above. The communications apparatus 1200 may be the network device described above, or may be a chip disposed in the network device described above. The communications apparatus 1200 may include a processor 1201 and a transceiver 1202. The processor 1201 may be configured to: perform all or some of the operations other than the receiving and sending operations performed by the network device in the embodiment shown in FIG. 9, for example, the step of determining a priority criterion by the network device, and/or support another process of the technology described in this specification. The transceiver 1202 may be configured to: perform S93 in the embodiment shown in FIG. 9, the process of sending a priority criterion to a terminal device, and the process of sending a use priority corresponding to each of the at least one priority criterion to the terminal device, and/or support another process of the technology described in this specification, for example, may perform all or some of the foregoing receiving and sending processes performed by the network device.

For example, the processor 1201 is configured to determine a priority criterion, where the priority criterion is used to determine a priority sequence of signals.

The transceiver 1202 is configured to send the priority criterion to a terminal device, where the priority criterion includes at least one of a first priority criterion, a second priority criterion, a third priority criterion, a fourth priority criterion, a fifth priority criterion, a sixth priority criterion, a seventh priority criterion, or an eighth priority criterion, where
- the first priority criterion is that a priority of an uplink channel is higher than a priority of a sidelink channel;
- the second priority criterion is that a priority of a broadcast channel is higher than a priority of a multicast channel or a unicast channel;
- the third priority criterion is that a priority of a multicast channel is higher than a priority of a unicast channel;
- the fourth priority criterion is that a priority of an LTE channel is higher than a priority of an NR channel;
- the fifth priority criterion is that a priority of a control channel is higher than a priority of a data channel;
- the sixth priority criterion is that a priority of a feedback channel is higher than a priority of a data channel;
- the seventh priority criterion is that a priority of a discovery channel is higher than a priority of a data channel;
- the eighth priority criterion is that a priority of a control channel, a feedback channel, a discovery channel, or a data channel is higher than a priority of an SRS; and
- the sidelink channel includes at least one of a PBCH, a PSFCH, a PSDCH, a PSCCH, or a PSSCH, and the uplink channel includes at least one of a PRACH, a PUCCH, or a PUSCH.

In a possible implementation, the transceiver 1202 is further configured to send a use priority corresponding to each of the at least one priority criterion to the terminal device, where the use priority is used to indicate a use ranking of the priority criterion corresponding to the use priority when the priority criterion is used to determine a to-be-sent signal.

All content related to the steps in the foregoing method embodiments may be cited in function descriptions of corresponding functional modules. Details are not described herein again.

Figure 13A:
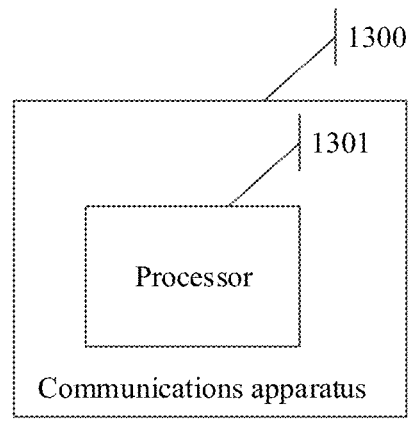
FIG. 13A and FIG. 13B are two schematic diagrams of a communications apparatus according to an embodiment of this application.

In a simple embodiment, a person skilled in the art may figure out that the communications apparatus 1100 or the communications apparatus 1200 may alternatively be implemented by using a structure of a communications apparatus 1300 shown in FIG. 13A. The communications apparatus 1300 may implement a function of the terminal device or the network device described above. The communications apparatus 1300 may include a processor 1301.

When the communications apparatus 1300 is configured to implement a function of the terminal device described above, the processor 1301 may be configured to: perform S91 and S92 in the embodiment shown in FIG. 9, and/or support another process of the technology described in this specification, for example, may perform all or some of the foregoing processes other than the receiving and sending processes performed by the terminal device. Alternatively, when the communications apparatus 1300 is configured to implement a function of the network device described above, the processor 1301 may be configured to: perform all or some of the operations other than the receiving and sending operations performed by the network device in the embodiment shown in FIG. 9, for example, the step of determining a priority criterion by the network device, and/or support another process of the technology described in this specification.

The communications apparatus 1300 may be implemented by using a field programmable gate array (FPGA), an application-specific integrated circuit (ASIC), a system on chip (SoC), a central processing unit (CPU), a network processor (NP), a digital signal processing circuit (DSP), a micro controller unit (MCU), a programmable logic device (PLD), or another integrated chip. The communications apparatus 1300 may be disposed in the terminal device or the network device in the embodiments of this application, so that the terminal device or the network device implements the method provided in the embodiments of this application.

In an optional implementation, the communications apparatus 1300 may include a transceiver component, configured to communicate with another device. When the communications apparatus 1300 is configured to implement the function of the terminal device or the network device described above, the transceiver component may be configured to: perform S93 in the embodiment shown in FIG. 9, and/or support another process of the technology described in this specification. For example, the transceiver component is a communications interface. If the communications apparatus 1300 is the terminal device or the network device, the communications interface may be a transceiver in the terminal device or the network device, for example, the transceiver 1102 or the transceiver 1202. The transceiver is, for example, a radio frequency transceiver component in the terminal device or the network device. Alternatively, if the communications apparatus 1300 is a chip disposed in the terminal device or the network device, the communications interface may be an input/output interface in the chip, for example, an input/output pin.

Figure 13B:
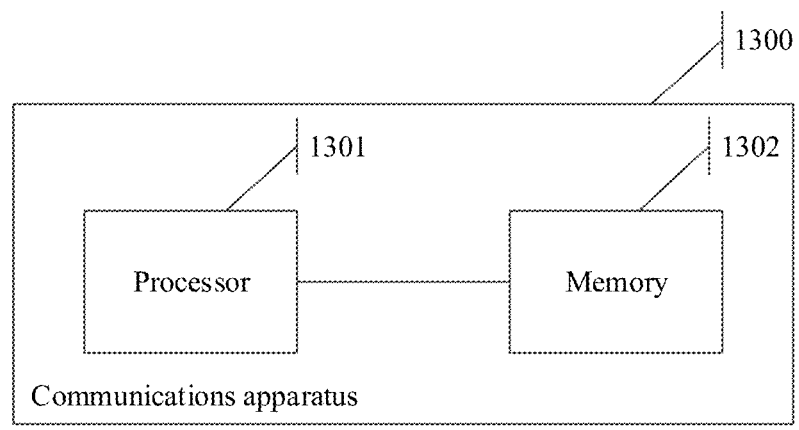

In an optional implementation, the communications apparatus 1300 may further include a memory 1302. Referring to FIG. 13B, the memory 1302 is configured to store computer programs or instructions, and the processor 1301 is configured to decode and execute these computer programs or instructions. It should be understood that these computer programs or instructions may include functional programs of the terminal device or the network device. When the functional programs of the terminal device are decoded and executed by the processor 1301, the terminal device may be enabled to implement the function of the terminal device in the method provided in the embodiment shown in FIG. 9 in the embodiments of this application. When the functional programs of the network device are decoded and executed by the processor 1301, the network device may be enabled to implement the function of the network device in the method provided in the embodiment shown in FIG. 9 in the embodiments of this application.

In another optional implementation, these functional programs of the terminal device or the network device are stored in an external memory of the communications apparatus 1300. When the functional programs of the terminal device are decoded and executed by the processor 1301, the memory 1302 temporarily stores some or all content of the functional programs of the terminal device. When the functional programs of the network device are decoded and executed by the processor 1301, the memory 1302 temporarily stores some or all content of the functional programs of the network device.

In another optional implementation, the functional programs of the terminal device or the network device are set to be stored in the memory 1302 in the communications apparatus 1300. When the memory 1302 in the communications apparatus 1300 stores the functional programs of the terminal device, the communications apparatus 1300 may be disposed in the terminal device in the embodiments of this application. When the memory 1302 in the communications apparatus 1300 stores the functional programs of the network device, the communications apparatus 1300 may be disposed in the network device in the embodiments of this application.

In still another optional implementation, some content of these functional programs of the terminal device is stored in an external memory of the communications apparatus 1300, and the other content of these functional programs of the terminal device is stored in the memory 1302 in the communications apparatus 1300. Alternatively, some content of these functional programs of the network device is stored in an external memory of the communications apparatus 1300, and the other content of these functional programs of the network device is stored in the memory 1302 in the communications apparatus 1300.

In the embodiments of this application, the communications apparatus 1100, the communications apparatus 1200, and the communications apparatus 1300 are presented in a form in which functional modules are obtained through division based on corresponding functions, or may be presented in a form in which functional modules are obtained through division in an integrated manner. The "module" herein may be an ASIC, a processor and a memory that execute one or more software or firmware programs, an integrated logic circuit, and/or another component that can provide the foregoing functions.

In addition, the communications apparatus 1100 provided in the embodiment shown in FIG. 11 may alternatively be implemented in another form. For example, the communications apparatus includes a processing module and a transceiver module. For example, the processing module may be implemented by the processor 1101, and the transceiver module may be implemented by the transceiver 1102. The processing module may be configured to: perform S91 and S92 in the embodiment shown in FIG. 9, and/or support another process of the technology described in this specification, for example, may perform all or some of the foregoing processes other than the receiving and sending processes performed by the terminal device. The transceiver module may be configured to: perform S93 in the embodiment shown in FIG. 9, and/or support another process of the technology described in this specification, for example, may perform all or some of the foregoing receiving and sending processes performed by the terminal device. The transceiver module may include a transceiver component that communicates with a network device, and may further include a transceiver component that communicates with another terminal device.

For example, the processing module is configured to determine that S signals overlap in time domain.

The processing module is further configured to determine M signals in the S signals based on a maximum transmit power of the terminal device and priorities of the S signals, where the S signals include n sidelink signals and k uplink signals, n is a positive integer, k is an integer greater than or equal to 0, a total transmit power of the M signals is less than or equal to the maximum transmit power, and M is a positive integer.

The transceiver module is configured to send the M signals.

In a possible implementation, the processing module is configured to determine, in the following manner, the M signals in the S signals based on the maximum transmit power of the terminal device and the priorities of the S signals: when a total transmit power of the S signals is greater than the maximum transmit power, determining the M signals in the S signals based on the maximum transmit power and the priorities of the S signals.

In a possible implementation, priorities of the M signals are higher than priorities of S−M signals other than the M signals in the S signals.

In a possible implementation, a total transmit power of the M signals and a first signal is greater than the maximum transmit power, the total transmit power of the M signals is less than the maximum transmit power, and the first signal is a signal with a highest priority in the S−M signals other than the M signals in the S signals; and the transceiver module is further configured to send the first signal at a remaining transmit power, where the remaining transmit power is a difference between the maximum transmit power and the total transmit power of the M signals.

In a possible implementation, the sidelink signal is a signal carried on a sidelink channel, or the uplink signal is a signal and/or an SRS carried on an uplink channel; a priority sequence of the S signals is determined based on a priority criterion; the sidelink channel includes at least one of a PBCH, a PSFCH, a PSDCH, a PSCCH, or a PSSCH; the uplink channel includes at least one of a PRACH, a PUCCH, or a PUSCH; and the priority criterion includes at least one of a first priority criterion, a second priority criterion, a third priority criterion, a fourth priority criterion, a fifth priority criterion, a sixth priority criterion, a seventh priority criterion, or an eighth priority criterion;

the first priority criterion is that a priority of an uplink channel is higher than a priority of a sidelink channel;
the second priority criterion is that a priority of a broadcast channel is higher than a priority of a multicast channel or a unicast channel;
the third priority criterion is that a priority of a multicast channel is higher than a priority of a unicast channel;
the fourth priority criterion is that a priority of an LTE channel is higher than a priority of an NR channel;
the fifth priority criterion is that a priority of a control channel is higher than a priority of a data channel;
the sixth priority criterion is that a priority of a feedback channel is higher than a priority of a data channel;
the seventh priority criterion is that a priority of a discovery channel is higher than a priority of a data channel; and
the eighth priority criterion is that a priority of a control channel, a feedback channel, a discovery channel, or a data channel is higher than a priority of an SRS.

In a possible implementation, each of the at least one priority criterion corresponds to one use priority, and the use priority is used to indicate a use ranking of the priority criterion corresponding to the use priority when the priority criterion is used to determine the M signals.

In a possible implementation, the M signals have a same priority, a transmit power of each of the M signals is P/M, and P is the maximum transmit power.

In a possible implementation,
the maximum transmit power is a maximum transmit power supported by a capability of the terminal device; or
the maximum transmit power is a maximum transmit power configured by a network device for the terminal device; or
the maximum transmit power is a maximum transmit power determined by the terminal device based on a maximum transmit power supported by a capability of the terminal device and a maximum transmit power configured by a network device for the terminal device.

In a possible implementation, M=S, and the total transmit power of the S signals is less than or equal to the maximum transmit power.

All content related to the steps in the foregoing method embodiments may be cited in function descriptions of corresponding functional modules. Details are not described herein again.

The communications apparatus 1200 provided in the embodiment shown in FIG. 12 may alternatively be implemented in another form. For example, the communications apparatus includes a processing module and a transceiver module. For example, the processing module may be implemented by the processor 1201, and the transceiver module may be implemented by the transceiver 1202. The processing module may be configured to: perform all or some of the operations other than the receiving and sending operations performed by the network device in the embodiment shown in FIG. 9, for example, the step of determining a priority criterion by the network device, and/or support another process of the technology described in this specification. The transceiver module may be configured to: perform S33 in the embodiment shown in FIG. 9, the process of sending a priority criterion to a terminal device, and the process of sending a use priority corresponding to each of the at least one priority criterion to the terminal device, and/or support another process of the technology described in this specification, for example, may perform all or some of the foregoing receiving and sending processes performed by the network device.

For example, the processing module is configured to determine a priority criterion, where the priority criterion is used to determine a priority sequence of signals.

The transceiver module is configured to send the priority criterion to a terminal device, where the priority criterion includes at least one of a first priority criterion, a second priority criterion, a third priority criterion, a fourth priority criterion, a fifth priority criterion, a sixth priority criterion, a seventh priority criterion, or an eighth priority criterion, where the first priority criterion is that a priority of an uplink channel is higher than a priority of a sidelink channel;

the second priority criterion is that a priority of a broadcast channel is higher than a priority of a multicast channel or a unicast channel;

the third priority criterion is that a priority of a multicast channel is higher than a priority of a unicast channel;

the fourth priority criterion is that a priority of an LTE channel is higher than a priority of an NR channel;

the fifth priority criterion is that a priority of a control channel is higher than a priority of a data channel;

the sixth priority criterion is that a priority of a feedback channel is higher than a priority of a data channel;

the seventh priority criterion is that a priority of a discovery channel is higher than a priority of a data channel;

the eighth priority criterion is that a priority of a control channel, a feedback channel, a discovery channel, or a data channel is higher than a priority of an SRS; and the sidelink channel includes at least one of a PBCH, a PSFCH, a PSDCH, a PSCCH, or a PSSCH, and the uplink channel includes at least one of a PRACH, a PUCCH, or a PUSCH.

In a possible implementation, the transceiver module is further configured to send a use priority corresponding to each of the at least one priority criterion to the terminal device, where the use priority is used to indicate a use ranking of the priority criterion corresponding to the use priority when the priority criterion is used to determine a to-be-sent signal.

All content related to the steps in the foregoing method embodiments may be cited in function descriptions of corresponding functional modules. Details are not described herein again.

The communications apparatus 1100, the communications apparatus 1200, and the communications apparatus 1300 provided in the embodiments of this application may be configured to perform the method provided in the embodiment shown in FIG. 9. Therefore, for technical effects that can be achieved by the communications apparatus 1100, the communications apparatus 1200, and the communications apparatus 1300, refer to the foregoing method embodiment, and details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or the functions according to the embodiments of this application are all or partially generated. The computer may be a general-purpose computer, a special-purpose computer, a computer network, or another programmable apparatus. The computer instructions may be stored in a computer-readable storage medium, or may be transmitted from one computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It is clear that a person skilled in the art can make various modifications and variations to the embodiments of this application without departing from the spirit and scope of this application. In this way, this application is intended to cover these modifications and variations of the embodiments of this application provided that they fall within the scope of the claims of this application and their equivalent technologies.

What is claimed is:

1. A signal sending method, comprising:
determining M sidelink signals in S sidelink signals based on a maximum transmit power of a terminal device and priorities of the S sidelink signals, wherein:
a total transmit power of the M sidelink signals is less than or equal to the maximum transmit power,
M is a positive integer,
the S sidelink signals overlap in time domain, S is an integer greater than or equal to 2,
and the S sidelink signals are signals carried on a physical sidelink feedback channel (PSFCH), and
S is a positive integer; and
sending the M sidelink signals, wherein a transmit power of each of the M sidelink signals is P/M, and P is the maximum transmit power, the M signals have the same priority.

2. The method according to claim 1, wherein the determining M sidelink signals in the S sidelink signals based on a maximum transmit power of a terminal device and priorities of the S sidelink signals comprises:
when a total transmit power of the S sidelink signals is greater than the maximum transmit power, determining the M sidelink signals in the S sidelink signals based on the maximum transmit power and the priorities of the S sidelink signals.

3. The method according to claim 1, wherein priorities of the M sidelink signals are higher than priorities of S−M sidelink signals other than the M sidelink signals in the S sidelink signals.

4. The method according to claim 1, wherein
the maximum transmit power is a maximum transmit power supported by a capability of the terminal device; or the maximum transmit power is a maximum transmit power configured by a network device for the terminal device; or the maximum transmit power is a maximum transmit power determined by the terminal device based on a maximum transmit power supported by a capability of the terminal device and a maximum transmit power configured by a network device for the terminal device.

5. The method according to claim 1, wherein M=S, and the total transmit power of the S sidelink signals is less than or equal to the maximum transmit power.

6. An apparatus, comprising:

one or more processors; and a memory, wherein the memory stores instructions for execution by the one or more processors, that prompt the apparatus to perform the steps of:

determining M sidelink signals in S sidelink signals based on a maximum transmit power of the terminal device and priorities of the S sidelink signals, wherein:

a total transmit power of the M sidelink signals is less than or equal to the maximum transmit power, M is a positive integer, the S sidelink signals overlap in time domain, and S is an integer greater than or equal to 2, wherein the S sidelink signals are signals carried on a physical sidelink feedback channel (PSFCH), S is a positive integer; and sending the M sidelink signals, wherein a transmit power of each of the M sidelink signals is P/M, and P is the maximum transmit power, the M signals have the same priority.

7. The apparatus according to claim 6, wherein when a total transmit power of the S sidelink signals is greater than the maximum transmit power, determining the M sidelink signals in the S sidelink signals based on the maximum transmit power and the priorities of the S sidelink signals.

8. The apparatus according to claim 6, wherein priorities of the M sidelink signals are higher than priorities of S–M sidelink signals other than the M sidelink signals in the S sidelink signals.

9. The apparatus according to claim 6, wherein the maximum transmit power is a maximum transmit power supported by a capability of the terminal device; or the maximum transmit power is a maximum transmit power configured by a network device for the terminal device; or the maximum transmit power is a maximum transmit power determined by the terminal device based on a maximum transmit power supported by a capability of the terminal device and a maximum transmit power configured by a network device for the terminal device.

10. The apparatus according to claim 6, wherein M=S, and the total transmit power of the S sidelink signals is less than or equal to the maximum transmit power.

* * * * *